United States Patent [19]

Kawaguchi et al.

[11] Patent Number: 5,269,955
[45] Date of Patent: Dec. 14, 1993

[54] LUBRICATING OIL FOR COMPRESSION-TYPE REFRIGERATORS AND POLYOXYALKYLENE GLYCOL DERIVATIVE

[75] Inventors: Yasuhiro Kawaguchi; Nobuaki Shimizu, both of Sodegaura; Masato Kaneko, Ichihara, all of Japan

[73] Assignee: Idemitsu Kosan Co., Ltd., Tokyo, Japan

[21] Appl. No.: 518,501

[22] Filed: May 2, 1990

[30] Foreign Application Priority Data

May 8, 1989 [JP] Japan .................. 1-113646
Oct. 24, 1989 [JP] Japan .................. 1-274789
Feb. 16, 1990 [JP] Japan .................. 2-033669

[51] Int. Cl.$^5$ ............... C10M 105/08; C10M 107/20; C07C 41/00; C01K 5/00
[52] U.S. Cl. ................... 252/52 A; 252/68; 62/114; 568/600
[58] Field of Search ........... 252/52 A, 68, 69; 62/114; 568/600, 601, 602

[56] References Cited

U.S. PATENT DOCUMENTS

| | | | |
|---|---|---|---|
| 3,272,889 | 9/1966 | Vandenberg | 260/823 |
| 3,579,466 | 5/1971 | Quinlan | 252/331 |
| 4,248,726 | 2/1981 | Uchinuma et al. | 252/68 |
| 4,267,064 | 5/1981 | Sasaki et al. | 252/68 |
| 4,755,316 | 7/1988 | Magid | 252/68 |
| 4,851,144 | 7/1989 | McGraw | 252/52 A |
| 4,900,463 | 2/1990 | Thomas et al. | 252/54 |
| 4,916,914 | 4/1990 | Short | 62/84 |
| 4,948,525 | 8/1990 | Sasaki et al. | 252/52 A |
| 4,971,712 | 11/1990 | Gorski et al. | 252/52 A |

FOREIGN PATENT DOCUMENTS 0642255 9/1947 United Kingdom .
0647266 10/1947 United Kingdom .

*Primary Examiner*—Prince Willis, Jr.
*Assistant Examiner*—J. Silbermann
*Attorney, Agent, or Firm*—Antonelli, Terry, Stout & Kraus

[57] ABSTRACT

Disclosed is a lubricating oil for compression-type refrigerators comprising, as a main component, a polyoxyalkylene glycol derivative which has at least one constitutional unit represented by the general formula:

$$-\underset{\underset{R^2}{|}}{\overset{\overset{R^1}{|}}{C}}-\underset{\underset{R^4}{|}}{\overset{\overset{R^3}{|}}{C}}-O- \quad (I)$$

wherein $R^1$ to $R^4$ are as defined in the specification. Said lubricating oil for compression-type refrigerators has good miscibility with refrigerants including R-134a.

11 Claims, 12 Drawing Sheets

LUBRICATING OIL FOR COMPRESSION-TYPE REFRIGERATORS AND POLYOXYALKYLENE GLYCOL DERIVATIVE

BACKGROUND OF THE INVENTION

1. Field of the Invention

The present invention relates to a lubricating oil for compression-type refrigerators and a novel polyoxyalkylene glycol derivative. More particularly, it relates to a lubricating oil for compression-type refrigerators having high lubricating property as well as good miscibility with hydrofluorocarbons (HFC) including 1,1,1.2-tetrafluoroethane (hereinafter referred to as R-134a), which can substitute for chlorofluorocarbons (CFC) including dichlorodifluoromethane (hereinafter referred to as R-12) used as a refrigerant and concerned for enviromental pollution problems, and a novel polyoxyalkylene glycol derivative effective as said lubricating oil. In the present specification, the term "hydrofluorocarbons (HFC)" means hydrofluorocarbons (HFC) including R-134a and hydrochlorofluorocarbons (HCFC) including R-22.

2. Description of the Related Arts

Generally, a compression-type refrigerator is composed of a compressor, a condenser, expansion valve, and an evaporator, having a mechanism wherein the mixture of a refrigerant and a lubricating oil is circulating in the closed system. In said compression-type refrigerator, though it depends on the kind of apparatus, generally the temperature in the compressor rises to 50° C. or higher, while in the cooler, the temperature comes to be −40° C. or so. Accordingly, the refrigerant and the lubricating oil must circulate in this system without phase separation usually in the range of −40° to +50° C. If phase separation occurs while the refrigerator is running, it affects the life and efficiency of the apparatus seriously. For example, if phase separation of the refrigerant and the lubricating oil occurs in the compressor, the moving parts would be inadequately lubricated, resulting in seizure or other troubles and thereby the life of apparatus is shortened considerably. If phase separation occurs in the evaporator, a lubricating oil having high viscosity exists and thereby the efficiency of heat exchange is decreased.

Since a lubricating oil for refrigerators is used for the purpose of lubricating the moving parts of the refrigerator, its lubricating property is also important as a matter of course. Since the temperature becomes very high, particularly in the compressor, it is required to have a sufficient viscosity to retain the oil film necessary for lubricating. Necessary viscosity varies with the kind or running conditions of the compressor, but usually, the kinematic viscosity of the lubricating oil before mixing with a refrigerant is preferably 2 to 50 cSt at 100° C. If the kinematic viscosity is lower than the above, the oil film becomes thinner and thereby seizure is liable to arise, while if it is higher, the efficiency of heat exchange is decreased.

Heretofore, R-12 has often been used as the refrigerant for compression-type refrigerators, and various mineral oils and synthetic oils have been used as the lubricating oil, satisfying the required properties described above. R-12, however, has recently been restricted more and more severely all over the world, for the concern of environmental pollution problems, that is depletion of the ozone layer. Therefore, hydrofluorocarbons including R-134a have come to be noticed as a new refrigerant. Said hydrofluorocarbons, particularly R-134a has little possibility of depleting the ozone layer and can substitute for R-12, with minimal changes in the structure of the conventional refrigerators. Accordingly, it is preferable as a refrigerant for compression-type refrigerators.

When hydrofluorocarbons including the above R-134a are employed as the refrigerant for compression-type refrigerators in place of R-12, the desirable lubricating oils come to be those having high miscibility with said hydrofluorocarbons including R-134a, and also having high lubricating property to satisfy the required properties described above. However, since the conventional lubricating oils which have been used with R-12 do not have good miscibility with hydroflurorocarbons including R-134a, a new lubricating oil suitable for said compounds is required. In this case, particularly in the air-conditioner for automobiles, it is required that the equipment be hardly changed on the substitution for R-12. Therefore it is not desirable to change widely the present equipment due to a lubricating oil. Accordingly, a lubricating oil having very favorable miscibility with hydrofluorocarbons including R-134a is required.

As lubricating oils having miscibility with R-134a, for example, Ulcon LB-165 and Ulcon LB-525 (trade name, both produced by Union Carbide Co., Ltd.) composed of polyalkyleneglycol have been known, and it was reported that these lubricating oils are miscible with R-134a in all proportions at low temperature of at least −50° C. ("Research Disclosure", No. 17463 (October, 1978)). And also, oil compositions for refrigerators with a high viscosity employing polyoxypropyleneglycol monobutyl ether as a base oil have been known (Japanese Patent Publication No. 42119/1982).

These lubricating oils, however, are polyalkylenenglycol derivatives having polypropyleneglycol with hydroxyl group at one terminal and an n-butyl ether bond at the other terminal. They have comparatively good miscibility with R-134a at low temperatures, but they do not have sufficient miscibility with R-134a at high temperatures, and for example, Ulcon LB-525 described above is known to cause phase separation with R-134a at room temperature (Specification of U.S. Pat. No. 4,755,316).

On the other hand, polyoxyalkylene glycol having at least two hydroxyl groups in a molecule is proposed to be a favorable substance miscible with R-134a (Specification of U.S. Pat. No. 4,755,316). In said polyoxyalkylene glycol, however, its miscibility is not necessary sufficient.

Meanwhile, it is known that polyoxyalkylene glycol generally shows a temperature dependency that the mixture thereof with hydrofluorocarbons, which has been phase-separated, is one dissolved and phase-separated again when heated from low temperatures to high temperatures. It is also known that the miscibility is lowered as the molecular weight of polyoxyalkylene glycol increases.

On the other hand, R-134a and compounds which can dissolve it were proposed for use in absorption-type refrigerators (Japanese Patent Application Laid-Open No. 79175/1981). Said absorption-type refrigerators, however, are quite different in mechanism from the compression-type refrigerators described above, and tetraethylene glycol dimethyl ether described in the Examples of the above Application is not proper as a lubricating oil for compression-type refrigerators because of its particularly low viscosity.

As described above, lubricating oils for compression-type refrigerators having sufficiently good miscibility with R-134a and high lubricating property have not been found yet, and their development has been eagerly desired.

SUMMARY OF THE INVENTION

The object of the present invention is to provide a lubricating oil for compression-type refrigerators having high lubricating property as well as good miscibility over the entire temperature range of application with hydrofluorocarbons including R-134a, which can substitute for R-12 as a refrigerant involved in environmental pollution problems, or other chlorofluorocarbons difficult to decompose.

Another object of the present invention is to provide a novel polyoxyalkylene glycol derivative effective as a lubricating oil for compression-type refrigerators.

Still another object of the present invention is to provide a method for effecting good lubrication in compression-type refrigerators using hydrofluorocarbons including R-134a.

Further another object of the present invention is to provide an excellent compression-type refrigerator system.

That is, the present invention provides a lubricating oil for compression-type refrigerators which comprise, as a main component, a polyoxyalkylene glycol derivative having at least one constitutional unit represented by the general formula (I):

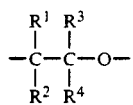

wherein $R^1$ to $R^4$ are each hydrogen, a monovalent hydrocarbon group having 1 to 10 carbon atoms, or a group represented by the general formula (II):

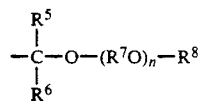

(wherein $R^5$ and $R^6$ are each hydrogen, a monovalent hydrocarbon group having 1 to 10 carbon atoms or an alkoxyalkyl group having 2 to 20 carbon atoms, $R^7$ is an alkylene group having 2 to 5 carbon atoms, a substituted alkylene group having 3 to 5 total carbon atoms with an alkyl group as a substituent, or a substituted alkylene group having 4 to 10 total carbon atoms with an alkoxyalkyl group as a substituent, n is an integer of 0 to 20, and $R^8$ is a monovalent hydrocarbon having 1 to 10 carbon atoms), and at least one of $R^1$ to $R^4$ is a group represented by the general formula (II).

Moreover, the present invention provides a polyoxyalkylene glycol derivative having the above constitutional unit, having a hydroxyl group, an acyloxyl group having 1 to 10 carbon atoms, an alkoxyl group having 6 to 10 carbon atoms or an aryloxyl group having 1 to 10 carbon atoms at each terminal, and also having a kinematic viscosity of 1 to 100 cSt at 100° C.

DESCRIPTION OF THE PREFERRED EMBODIMENTS

Figure 1:
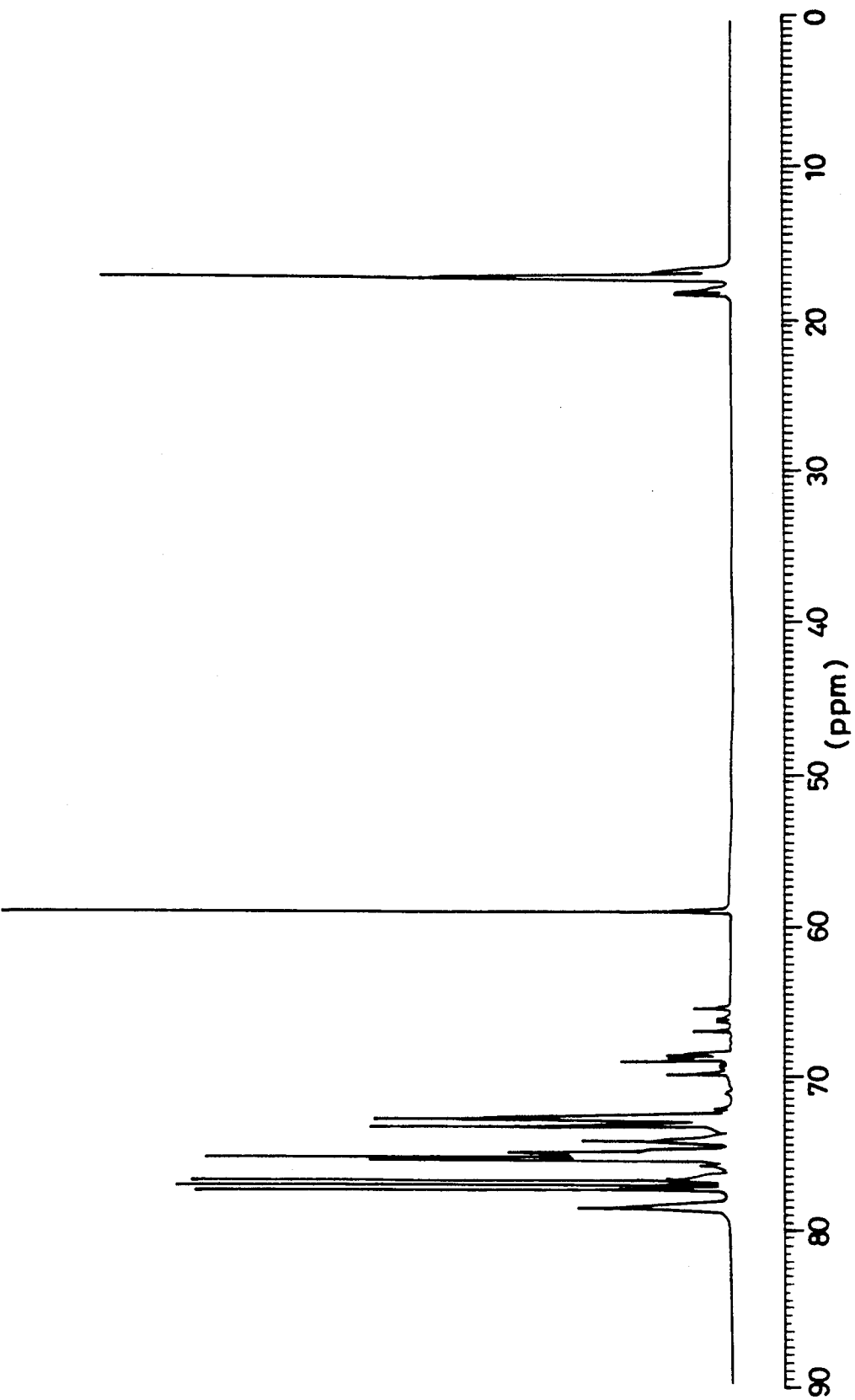
FIG. 1 shows $^{13}$C-NMR spectrum of polyoxyalkylene glycol obtained in Production Example 1.

The lubricating oil for compression-type refrigerators of the present invention contains at least one constitutional unit represented by the above general formula (I).

In the formula, $R^1$ to $R^4$ are each hydrogen, a monovalent hydrocarbon group having 1 to 10 carbon atoms, or group represented by the general formula (II).

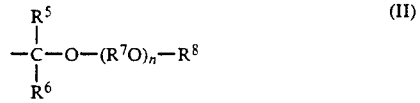

wherein a monovalent hydrocarbon group having 1 to 10 carbon atoms indicates generally an alkyl group having 1 to 10 carbon atoms, an alkenyl group having 2 to 10 carbon atoms, a cycloalkyl group having 5 to 10 carbon atoms, an aryl group having 6 to 10 carbon atoms, or an arylalkyl group having 7 to 10 carbon atoms. Specific examples are alkyl groups such as a methyl group, an ethyl group, an n-propyl group, an isopropyl group, various butyl groups, various pentyl groups, various hexyl groups, various heptyl groups, various octyl groups, various nonyl groups, and various decyl groups; alkenyl groups such as a vinyl group, an allyl group, a propenyl group, an isopropenyl group, various butenyl groups, various pentenyl groups, various hexenyl groups, various heptenyl groups, various octenyl groups, various nonenyl groups, and various decenyl groups; cycloalkyl groups such as a cyclopentyl group and a cyclohexyl group, aryl groups such as a phenyl group, various tolyl groups, various xylyl groups, and a naphthyl group; and arylalkyl groups such as a benzyl group, a 1-phenylethyl group, and a 2-phenylethyl group. Of these, a monovalent hydrocarbon group having 6 or less carbon atoms is preferable, and particularly an alkyl group having 3 or less carbon atoms, among all, a methyl group is optimum.

In the general formula (II), $R^5$ and $R^6$ are each hydrogen, a monovalent hydrocarbon group having 1 to 10 carbon atoms, or an alkoxyalkyl group having 2 to 20 carbon atoms, and a monovalent hydrocarbon group indicates generally an alkyl group having 1 to 10 carbon atoms, an alkenyl group having 2 to 10 carbon atoms, a cycloalkyl group having 5 to 10 carbon atoms, an aryl group having 6 to 10 carbon atoms, or an arylalkyl group having 7 to 10 carbon atoms. Specific examples are alkyl groups such as a methyl group, an ethyl group, an n-propyl group, an isopropyl group, various butyl groups, various pentyl groups, various hexyl groups, various heptyl groups, various octyl groups, various nonyl groups, and various decyl groups; alkenyl groups such as a vinyl group, an allyl group, a propenyl group, an isopropenyl group, various butenyl groups, various pentenyl groups, various hexenyl groups, various heptenyl groups, various octenyl groups, various nonenyl groups, and various decenyl groups; cycloalkyl groups such as a cyclopentyl group and a cyclohexyl group; aryl groups such as a phenyl group, various tolyl groups, various xylyl groups, and a naphthyl group; arylalkyl groups such as a benzyl group, a 1-phenylethyl group, and a 2-phenylethyl group; and alkoxyalkyl groups such as a methoxymethyl group, an ethoxymethyl group, an n-propoxymethyl group, an isopropoxymethyl group, various butoxymethyl groups, various pentoxymethyl groups, various hexoxymethyl groups, various heptoxymethyl groups, various octoxymethyl groups, various nonyloxymethyl groups, a 1-methoxyethyl group, a 2-methoxyethyl group, a 1-ethoxyethyl group, a 2-ethoxyethyl group, various propoxyethyl group, various butoxyethyl groups, various pentoxyethyl groups, various hexoxyethyl groups, various heptoxyethyl groups, various octoxyethyl groups, various methoxypropyl groups, various ethoxypropyl groups, various propoxypropyl groups, various butoxypropyl groups, various pentoxypropyl groups, various hexoxypropyl groups, various heptoxypropyl groups, various methoxybutyl groups, various ethoxybutyl groups, various propoxybutyl groups, various butoxybutyl groups, various pentoxybutyl groups, various hexoxybutyl groups, various methoxypentyl groups, various ethoxypentyl groups, various propoxypentyl groups, various butoxypentyl groups, various pentoxypentyl groups, various methoxyhexyl groups, various ethoxyhexyl groups, various propoxyhexyl groups, various butoxyhexyl groups, various methoxyheptyl groups, various ethoxyheptyl groups, various propoxyheptyl groups, various methoxyoctyl groups, various ethoxyoctyl groups, and various methoxynonyl groups. Of these an alkyl group having 3 or less carbon atoms or an alkoxyalkyl group having 6 or less carbon atoms is preferable. Among them, hydrogen is the most suitable as $R^5$ and $R^6$.

$R^7$ indicates an alkylene group having 2 to 5 carbon atomes, a substituted alkylene group having 3 to 5 total carbon atoms with an alkyl group as a substituent, or a substituted alkylene group having 4 to 10 total carbon atoms with an alkoxyalkyl group as a substituent. Specific examples are an ethylene group, a 1-methylethylene group, a 2-methylethylene group, ethylethylene groups, a 1,1-dimethylethylene group, a 1,2-dimethylethylene group, n-propylethylene groups, isopropylethylene groups, a 1-ethyl-2-methylethylene group, a 1-ethyl-1-methylethylene group, a trimethylene group, a tetramethylene group, a pentamethylene group, (methoxymethyl)ethylene groups, (ethoxymethyl)ethylene groups, (methoxyethyl)ethylene groups, a 1-methoxymethyl-2-methylethylene group, a 1,2-bis(methoxymethyl)ethylene group, a 1,1-bis(methoxymethyl)ethylene group, (ethoxyethyl)ethylene groups, a 1,2-bis(ethoxyethyl)ethylene group, a 1,1-bis(ethoxyethyl)ethylene group, a 2-methoxy-1,3-propylene group, and an ethylene group having 6 or less carbon atoms and a substituted ethylene group having 6 or less carbon atoms. Among them, particularly preferred ones as $R^7$ are an ethylene group, a 1-methylethylene group, 2-methylethylene group and a trimethylene group. n, representing the repetition number of $R^7O$ unit, is an integer of 0 to 20, preferably an integer of 0 to 3.

$R^8$ indicates a monovalent hydrocarbon group having 1 to 10 carbon atoms and generally an alkyl group having 1 to 10 carbon atoms, an alkenyl group having 2 to 10 carbon atoms, a cycloalkyl group having 5 to 10 carbon atoms, an aryl group having 6 to 10 carbon atoms, or an arylalkyl group having 7 to 10 carbon atoms. Specific examples are alkyl groups such as a methyl group, an ethyl group, a n-propyl group, an isopropyl group, various butyl groups, various pentyl groups, various hexyl groups, various heptyl groups, various octyl groups, various nonyl groups, and various decyl groups; alkenyl groups such as a vinyl group, an allyl group, a propenyl group, an isopropenyl group, various butenyl groups, various pentenyl groups, various hexenyl groups, various heptenyl groups, various octenyl groups, various nonenyl groups, and various decenyl groups; cycloalkyl groups such as a cyclopentyl group and a cyclohexyl group, aryl groups such as a phenyl group, various tolyl groups, various xylyl groups, and a naphthyl group; arylalkyl groups such as a benzyl group, a 1-phenylethyl group, and a 2-phenylethyl group. Of these, hydrocarbon groups having 6 or less carbon atoms are preferable, and particularly hydrocarbon groups having 1 to 3 carbon atoms are optimum.

In the above general formula (I), at least one of $R^1$ to $R^4$ is a group represented by the general formula (II). Particularly, it is preferable that either $R^1$ or $R^3$ is a group of the general formula (II), and the other $R^1$ or $R^3$, and $R^2$ and $R^4$ are each hydrogen or a monovalent hydrocarbon group having 1 to 10 carbon atoms. Also preferable are those in which two of $R^1$ to $R^4$ are the groups represented by the general formula (II).

The polyoxyalkylene glycol derivative as a main component of the lubricating oil of the present invention contains at least one constitutional unit represented by the above general formula (I), and more particularly it is roughly divided into three kinds of polymers; a homopolymer comprising a constitutional unit of said general formula (I), a copolymer comprising at least two different constitutional units contained in the general formula (I), a copolymer comprising a constitutional unit of the general formula (I) and other constitutional units, for example, a constitutional unit represented by the general formula (III):

wherein $R^{31}$ to $R^{34}$ are each hydrogen or an alkyl group having 1 to 3 carbon atoms.

Preferable examples of the above homopolymer are homopolymers having 1 to 200 constitutional units A represented by the general formula (I) and having a hydroxyl group, an acyloxyl group having 1 to 10 carbon atoms, an alkoxyl group having 1 to 10 carbon atoms, and an aryloxyl group having 6 to 10 carbon atoms at each terminal.

Preferable examples of said copolymer are copolymers having two kinds of 1 to 200 constitutional units A and B represented by the general formula (I), or having 1 to 200 constitutional units A represented by the general formula (I), and 1 to 200 constitutional units C represented by the general formula (III), and having a hydroxyl group, an acyloxyl group having 1 to 10 carbon atoms, an alkoxyl group having 1 to 10 carbon atoms, and an aryloxyl group having 6 to 10 carbon atoms at each terminal.

These copolymers include an alternating copolymer of constitutional units A and B (or C), a random copolymer, a block copolymer, or a graft copolymer wherein a constitutional unit B is graft-bonded to the main chain of a constitutional unit A, and the like.

The polyoxyalkylene glycol derivative to be used in the lubricating oil of the present invention can be produced, for example, according to the methods shown below.

Method (A)

An oxirane compound represented by the general formula (IV):

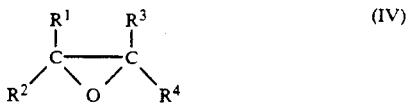

(wherein $R^1$ to $R^4$ are the same as the above) is polymerized alone or at least two kinds of compound represented by the formula (IV) are mixed and copolymerized to obtain a polyoxyalkylene glycol derivative.

Moreover, a compound represented by the formula (IV) and alkylene oxide having 2 to 8 carbon atoms such as ethylene oxide and propylene oxide represented by the general formula (V):

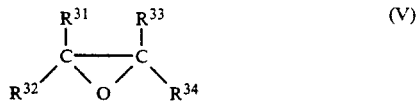

(wherein $R^{31}$ to $R^{34}$ are the same as the above) are mixed and copolymerized to obtain a polyoxylkylene glycol derivative.

There are various oxirane compounds represented by the general formula (IV), depending on the kinds of $R^1$ to $R^4$. Specific examples are glycidyl methyl ether, ethyl glycidyl ether, glycidyl propyl ether, butyl glycidyl ether, 2-ethylhexyl glycidyl ether, glycidyl 2-methyloctyl ether, glycidyl vinyl ether, allyl glycidyl ether, glycidyl phenyl ether, sec-butylphenyl glycidyl ether, 4,7-dioxa-1,2-epoxyoctane, 1,2-epoxy-4,7,10-trioxaundecane, 1,2-epoxy-4, 7, 10,13-teraoxatetradecane, 4,7-dioxa-1,2-epoxy-5-methyloctane, 4,7-dioxa-1,2-epoxy-6-methyloctane, 6,9-dimethyl-1-2-epoxy-4,7,10-trioxaundecane, 1,2-epoxy-4,7,10,13-tetraoxa-6,9,12-trimethyltetradecane, 1,2-epoxy-5-methyl-4,7,10-trioxaundecane, 1,2-epoxy-8-methyl-4,7,10-trioxaundecane, 2,7-dioxa-4,5-epoxyoctane, 4,5-epoxy-9-methyl-2,7,10-trioxaundecane, 4,5-epoxy-2,7,10,13-tetraoxatetradecane, 7,8-epoxy-2,5,10,13-tetraoxatetradecane, 3, 12-dimethyl-7,8-epoxy-2,5,10,13-tetraoxatetradecane, 1,2-epoxy-3-methoxy-5-oxahexane, 4,8-dioxa-1,2-epoxy-6-methoxynonane, 4,7-dioxa 1,2,-epoxy-5-(2-oxapropyl)-octane, 3,5-bis(2-oxapropyl)-4,7-dioxa-1,2-epoxyoctane, 3,6-bis(2-oxapropyl)-4,7-dioxa-1,2-epoxyoctane, 6,9-bis(2-oxapropyl)-1,2-epoxy-4,7,10-oxaundecane, and the like.

As an initiator in polymerization, the conventional compounds can be used, including water, alkali hydroxide, 1 to 6 valent alcohol, alkoxide, thiol, 2,2'-thiodiethanol, sodium alkoxide of 2,2'-thiodiethanol, phenol, phenoxide, amine, and the like.

Method (B)

At least one homopolymer of oxirane compounds represented by the above general formula (IV), obtained by the above method (A) and a different kind of oxirane compounds represented by the above general formula (IV), or alkylene oxide having 2 to 8 carbon atoms represented by the above general formula (V) are polymerized to obtain the desired polyoxyalkylene glycol derivative. In this process, two kinds of reaction can be effected continuously in one reactor.

Method (C)

Alkylene oxide having 2 to 8 carbon atoms represented by the above general formula (V) is polymerized to obtain polyoxyalkylene glycol. Said polyoxyalkylene glycol and an oxirane compound represented by the above general formula (IV), or said oxirane compound and alkylene oxide of the general formula (V) are polymerized to obtain the desired polyoxyalkylene glycol derivative. In this process, two kinds of reaction can be effected continuously in one reactor.

The polyoxyalkylene glycol obtained by such methods (A) to (C) can further be improved in properties as a refrigerator oil, such as high miscibility, low hygroscopicity, high viscosity index, and high lubricating property, by esterification or etherification of the entire or a part of hydroxyl groups at the terminals of polyoxyalkylene glycol. The hydrocarbon group in the residue of ester or ether has preferably 1 to 10 carbon atoms.

In the lubricating oil of the present invention, in order to retain the thickness of oil film necessary for lubricating, the kinematic viscosity of the lubricating oil before blending with a refrigerant is preferably 1 to 100 cSt, most preferably 2 to 50 cSt at 100° C. Accordingly, in the above methods (A) to (C), it is preferable to select starting materials, initiators and reaction conditions so that polyoxyalkylene glycol derivatives having a kinematic viscosity within said range will be produced. However, those having a kinematic viscosity out of the above range can be adjusted to a preferable kinematic viscosity range by blending several kinds.

The polyoxyalkylene glycol derivative thus obtained may be used alone or in mixture of two or more kinds, and further, in order to improve properties of other lubricating oils, it can be used in mixture thereof.

The lubricating oil containing said polyoxyalkylene glycol derivative as a main component is used in the state of a mixture with a hydrofluorocarbon (R-134a, etc.) as a refrigerant (i.e., a mixture of said polyoxyalkylene glycol derivative and a hydrofluorocarbon) in employing as a lubricating oil for compression-type refrigerators.

If necessary, to the lubricating oil of the present invention, various additives used in the conventional lubricating oils such as anti-load additives, chlorine capturing agents, antioxidants, metal deactivators, defoaming agents, detergent dispersants, viscosity index improvers, oiliness agents, anti-wear additives, extreme pressure agents, rust inhibitors, anti-corrosion agents and pour point depressants can be added.

The above anti-load additives include organic sulfide-based additives such as mohosulfides, polysulfides, sulfoxides, sulfones, thiosulfinates, sulfurized fats and oils, thiocarbonates, thiophenes, thiazoles, and methanesulfonic acid esters; phosphate-based additives such as phosphoric monoesters, phosphoric diesters, and phosphoric triesters (tricresyl phosphate); phosphite-based additives such as phosphorous monoesters, phosphorous diesters, and phosphorous triesters; thiophosphate-based additives such as thiophosphoric acid triesters; fatty acid-based additives such as higher fatty acids, hydroxyaryl fatty acids, carboxylic acid-containing polyhydroxy alcohol esters, and metal soap; fatty acid ester-based additives such as polyhydroxy alcohol esters and acrylic acid esters; organic chlorine-based additives such as chlorinated hydrocarbons and chlorinated carboxylic acid derivatives; organic fluorine-based additives such as fluorinated aliphatic caroxylic acid, fluoroethylene resins, fluoroalkyl polysiloxanes, and fluorinated graphite; alcohol-based additives such as higher alcohols; and metallic compound-based additives such as naphthenates (lead naphthenate), fatty acid salts (fatty acid lead), thiophosphates (zinc dialkyldithiophosphate), thiocarbamates, organomolybdenum comounds, organic tin compounds, organogermanium compounds, and boric acid esters.

Chlorine capturing agents include compounds having glycidyl ether group, epoxyfatty acid monoesters, epoxy fats and oils, and compounds having epoxycycloalkyl group. Antioxidants include phenols (2,6-di-tert-butyl-p-cresol) and aromatic amines (α-naphthylamine). Metal deactivetors include benzotriazole derivatives. Defoaming agents include silicone oil (dimethylpolysiloxane) and polymethacrylates. Detergent dispersants include sulfonates, phenates and succinimides. Viscosity index improvers include polymethacrylate, polyisobutylene, ethylene-propylene copolymer, and hydrogenated styrene-diene copolymer.

The lubricating oil of the present invention is excellent in miscibility with a refrigerant and lubricating property, and is utilized for compression-type refrigerators. Particularly, unlike the conventional lubricating oils, the lubricating oil of the present invention has good miscibility with hydrofluorocarbons including R-134a, 1,1-dichloro-2,2,2-trifluoroethane (R-123), 1-chloro-1,1-difluoroethane (R-142b), 1,1-difluoroethane (R-152a), chlorodifluoromethane (R-22), and trifluoromethane (R-23).

Consequently, the lubricating oil of the present invention is suitable for effecting lubrication in compression-type refrigerators employing said hydrofluorocarbons, particularly R-134a as a refrigerant. Moreover, said lubricating oil can be used in mixture with other lubricaing oils for compression-type refrigeraotrs for the purpose of improving its miscibility with a refrigerant.

The polyoxyalkylene glycol derivative of the present invention has a constitutional unit represented by the above general formula (I), a hydroxyl group, an acyloxyl group having 1 to 10 carbon atoms, an alkoxyl group having 1 to 10 carbon atoms, and an aryloxyl group having 6 to 10 carbon atoms at each terminal, and also a kinematic viscosity of 1 to 100 cSt at 100° C.

Among said polyoxyalkylene glycol derivatives, three kinds of compound groups, (a), (b) and (c), shown below are specified.

(a) A polyoxyalkylene glycol derivative (derivative (a)) having 1 to 200 constitutional units represented by the general formula (I-(a)):

(wherein $R^{11}$ to $R^{14}$ are each hydrogen, a monovalent hydrocarbon group having 1 to 10 carbon atoms, or a group represented by the general formula (II-a))

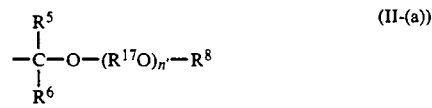

(wherein $R^5$, $R^6$ and $R^8$ are the same as the above, $R^{17}$ is an alkylene group having 3 to 5 carbon atoms, a substituted alkylene group having 3 to 5 total carbon atoms with an alkyl group as a substituent, or a substituted alkylene group having 4 to 10 total carbon atoms with an alkoxyalkyl group as a substituent, and n' is an integer of 1 to 20), and at least one of $R^{11}$ to $R^{14}$ is a group represented by the general formula (II-(a)), having a hydroxyl group, an acyloxyl group having 1 to 10 carbon atoms, an alkoxyl group having 1 to 10 carbon atoms, and an aryloxyl group having 6 to 10 carbon atoms at each terminal, and also having a kinematic viscosity of 1 to 100 cSt at 100° C.

(b) A polyoxyalkylene glycol derivative (derivative (b)) comprising copolymers having 1 to 200 constitutional units represented by the general formula (I-(b)):

(wherein $R^{21}$ to $R^{24}$ are each hydrogen, a monovalent hydrocarbon group having 1 to 10 carbon atoms, or a group represented by the general formula (II-(b)))

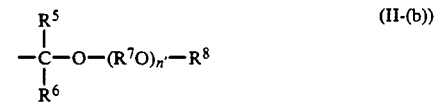

(wherein $R^5$ to $R^8$, and n' are the same as the above), and at least one of $R^{21}$ to $R^{24}$ is a group represented by the general formula (II-(b)), and having 1 to 200 constitutional units represented by the general formula (III):

(wherein $R^{31}$ to $R^{34}$ are each hydrogen and an alkyl group having 1 to 3 carbon atoms), and having a hydoxyl group, an acyloxyl group having 1 to 10 carbon atoms, an alkoxyl group having 1 to 10 carbon atoms, and an aryloxyl group having 6 to 10 carbon atoms at each terminal, and also a kinematic viscosity of 1 to 100 cSt at 100° C.

(c) A polyoxyalkylene glycol derivative (derivative (c)) having 1 to 200 constitutional units represented by the general formula (I-(c)):

(wherein $R^{41}$ to $R^{44}$ are each hydrogen, a monovalent hydrocarbon group having 1 to 10 carbon atoms, or a group represented by the general formula (II):

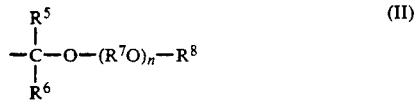

(wherein $R^5$ to $R^8$ and n are the same as the above), and at least two groups of $R^{41}$ to $R^{44}$ are represented by the general formula (II)), having a hydroxyl group, an acyloxyl group having 1 to 10 carbon atoms, an alkoxyl group having 1 to 10 carbon atoms, and an aryloxyl group having 6 to 10 carbon atoms at each terminal, and also having a kinematic viscosity of 1 to 100 cSt at 100° C.

The present invention is described in greater detail with reference to the following examples, though it is not intended to be limited thereto.

PRODUCTION EXAMPLE 1

In a 200-milliliter stainless steel autoclave equipped with a stirrer and a conduit, 3.0 g (0.056 mol) of powdery sodium methoxide was placed, sealed and heated to 110° C. 120 g of a mixture (molar ratio of 1:3) of glycidyl methylether and propylene oxide was introduced under pressure to the autoclave through the conduit over 13 hours with stirring.

To the reaction mixture, 120 ml of water and 240 ml of methanol were added and dissolved, and then the solution was passed through a 200 ml-column of cation-exchange resin and then through a 200 ml-column of anion-exchange resin to remove a sodium ion. After methanol and water were distilled away, the residue was dried at 100° C. for one hour under reduced pressure (0.4 mmHg) with a vacuum pump to obtain 115 g of the desired polyoxyalkylene glycol (having a methoxy group at one terminal and a hydroxyl group at the other terminal), a glycidyl methyl ether-propylene oxide copolymer. Carbon-13 nuclear magnetic resonance spectrum ($^{13}$C-NMR) (solvent: deuterochloroform) of said polyoxyalkylene glycol is shown in FIG. 1.

Figure 9:
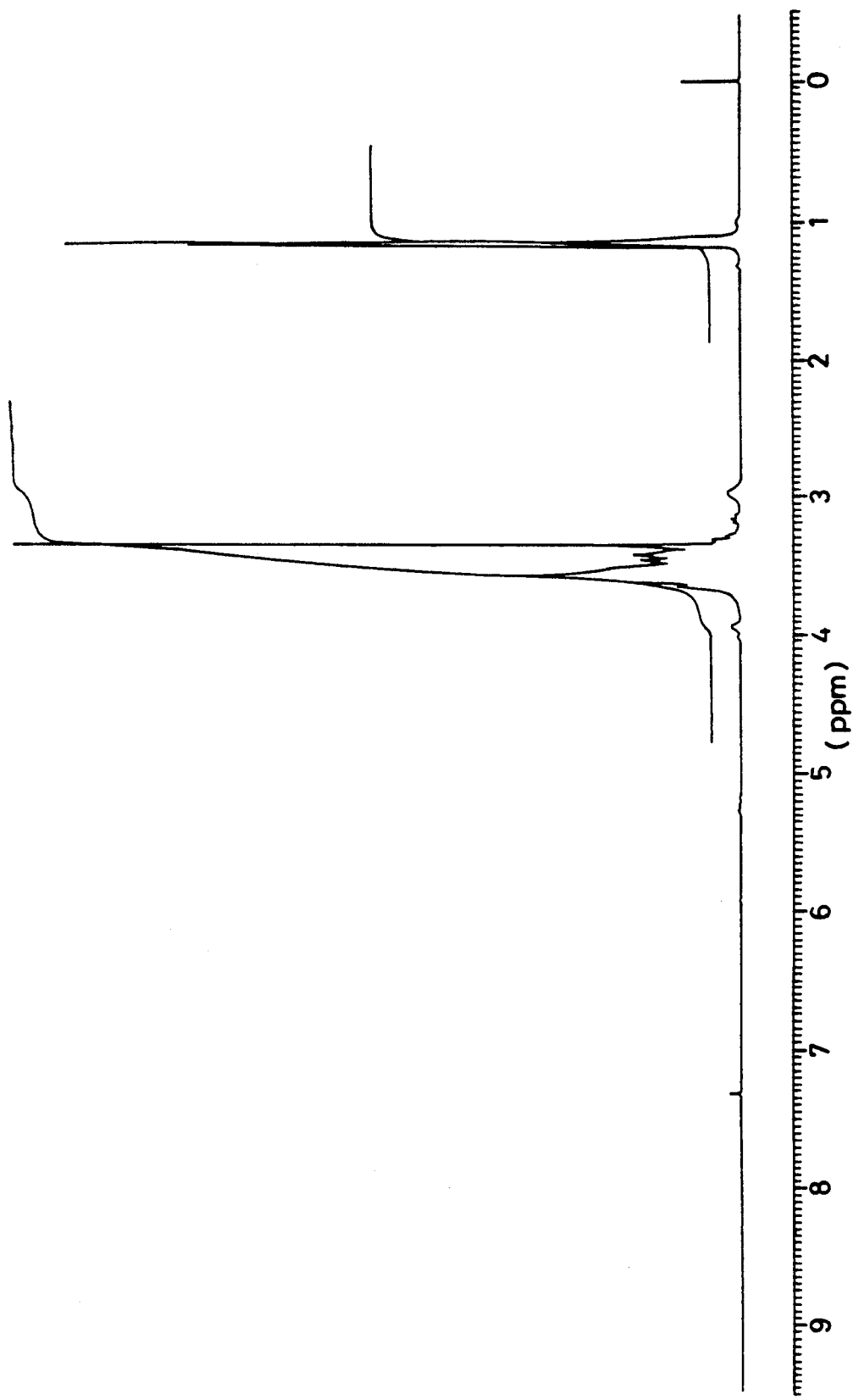
FIG. 9 shows $^1$H-NMR spectrum of polyoxyalkylene obtained in Production Example 1.

Proton nuclear magnetic resonance spectrum ($^1$H-NMR) (solvent: deuterochloroform) of said polyoxyalkylene glycol is shown in FIG. 9.

PRODUCTION EXAMPLE 2

In a 200-milliliter stainless steel autoclave equipped with a stirrer and a conduit, 3.0 g of powdery sodium methoxide was placed, sealed and heated to 110° C. 100 g of glycidyl methyl ether was introduced under pressure to the autoclave through the conduit over 9 hours with stirring.

To the reaction mixture, 100 ml of water and 200 ml of methanol were added and dissolved, and then the solution was passed through a 200 ml-column of cation-exchange resin and then through a 200 ml-column of anion-exchange resin to remove a sodium ion. After methanol and water were distilled away, the residue was dried at 100° C. for one hour under reduced pressure (0.4 mmHg) with a vacuum pump to obtain 89 g of the desired polyoxyalkylene glycol (having a methoxy group at one terminal and a hydroxyl group at the other terminal), a glycidyl methyl ether polymer.

PRODUCTION EXAMPLE 3

In a 300-milliliter three-necked glass flask equipped with a stirrer and a distillation head, 50 g of a glycidyl methyl ether-propylene oxide copolymer, that is, a polyoxyalkylene glycol derivative obtained in Production Example 1, 10 g of a solution of 28% by weight of sodium methoxide dissolved in methanol (0.052 mol of sodium methoxide), and 80 ml of toluene were placed and heated to distill away methanol and about 30 ml of toluene.

After cooling, the content was transferred into a 200-milliliter stainless steel autoclave equipped with a stirrer, and 15 g (0.11 mol) of methyl iodide was added and sealed. Then, the mixture was heated from 50 to 75° C. over 4.5 hours and maintained at 90° C. for 2.5 hours. After cooling to room temperature, the reaction mixture was dissolved in a mixture of 100 ml of water and 200 ml of methanol, and the solution was passed through a 200 ml-column of cation-exchange resin and then through a 200 ml-column of anion-exchange resin to remove a sodium ion and an iodide ion.

After methanol and water were distilled away, the residue was dried at 100° C. for one hour under reduced pressure (0.4 mmHg) with a vacuum pump to obtain 43 g of the desired polyoxyalkylene glycol derivative (having methoxy groups at both terminals), a glycidyl methyl ether-propylene oxide copolymer.

PRODUCTION EXAMPLE 4

Figure 10:
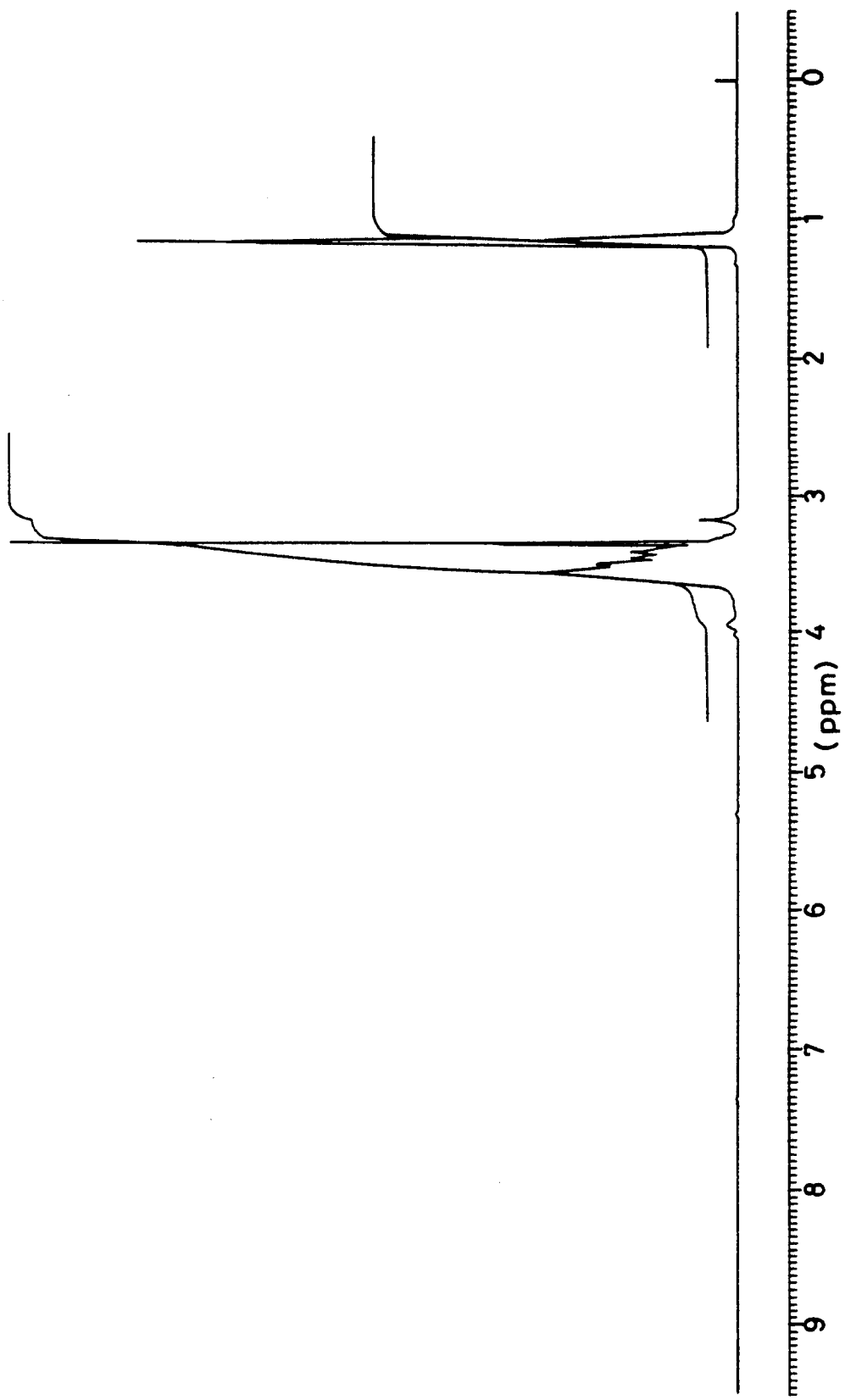
FIG. 10 shows $^1$H-NMR spectrum of polyoxyalkylene glycol obtained in Production Example 4.

The procedure of Production Example 1 was repeated except that 2.0 g (0.037 mol) of sodium methoxide was used, and 60 g of a mixture (molar ratio of 1:3) of glycidyl methyl ether and propylene oxide were introduced under pressure to the autoclave over 8.5 hours to obtain 58 g of the desired polyoxyalkylene glycol derivative (having a methoxy group at one terminal and a hydroxyl group at the other terminal), a glycidyl methyl ether-propylene oxide copolymer. $^1$H-NMR spectrum of said derivative (solvent: deuterochloroform) is shown in FIG. 10.

PRODUCTION EXAMPLE 5

Figure 2:
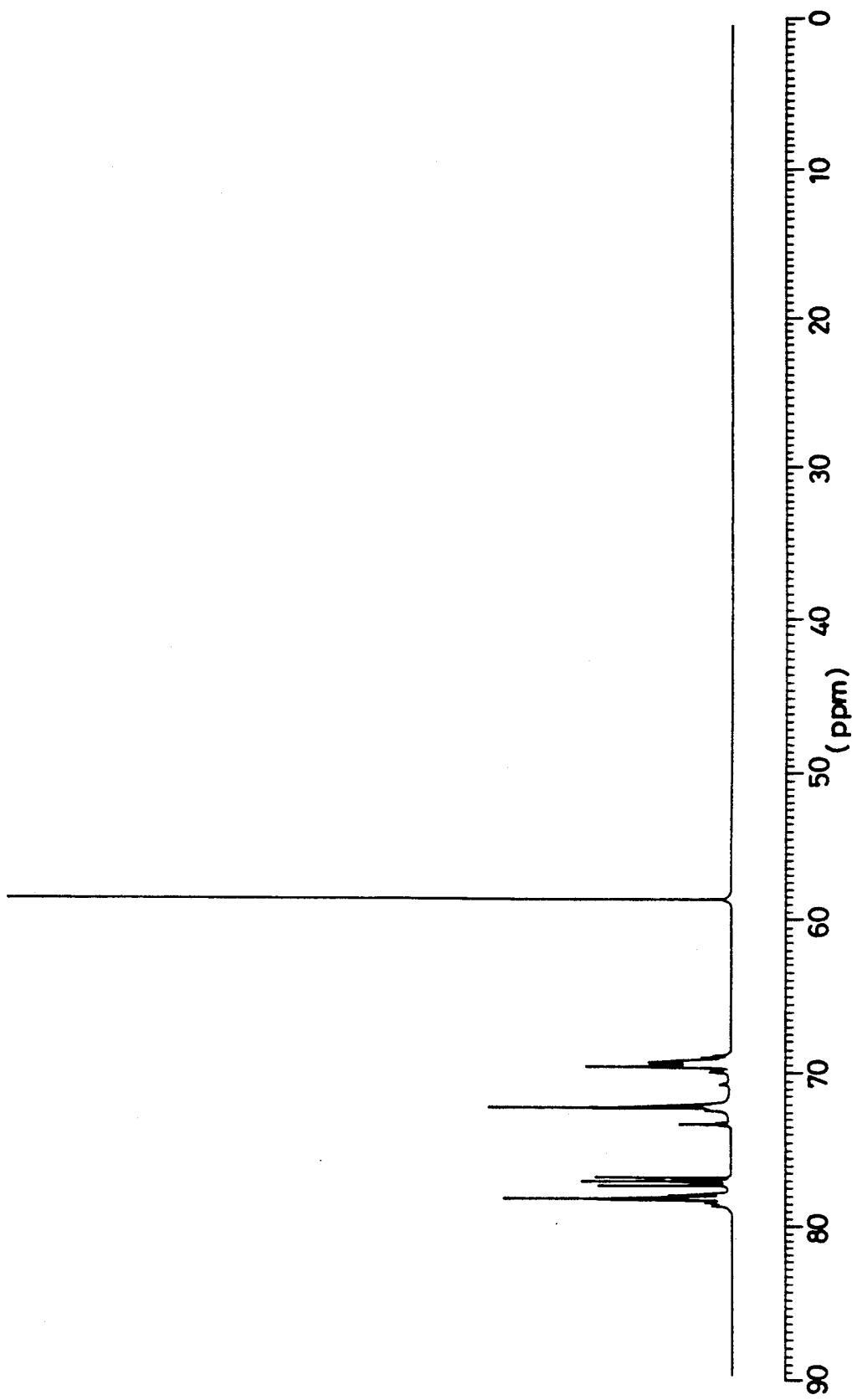
FIG. 2 shows $^{13}$C-NMR spectrum of polyoxyalkylene glycol obtained in Production Example 5.

The procedure of Production Example 2 was repeated except that 2.0 g (0.037 mol) of sodium methoxide was used and 100 g of glycidyl methyl ether was introduced to the autoclave over 10 hours to obtain 93 g of the desired polyoxyalkylene glycol (having a methoxy group at one terminal and a hydroxyl group at the other terminal), a glycidyl methyl ether polymer. $^{13}$C-NMR spectrum of said polyoxyalkylene glycol (solvent: deuterochloroform) is shown in FIG. 2.

PRODUCTION EXAMPLE 6

To 7.6 g (0.062 mol) of 2,2'-thiodiethanol, 20 g of a solution of 28% by weight of sodium methoxide dissolved in methanol (0.10 mol of sodium methoxide) and 50 cc of toluene were added and the mixture was stirred at 70° C. for 4 hours to distill away methanol. And further, unreacted 2,2'-thiodiethanol and toluene were distilled away at 100° C. for one hour under reduced pressure (0.3 mmHg) with a vacuum pump to obtain 9.5 g of sodium alkoxide of 2,2'-thiodiethanol.

In a 200-milliliter stainless steel autoclave equipped with a stirrer and a conduit, 6.14 g of said sodium alkoxide was placed, sealed and heated to 110° C. 100 g glycidyl methyl ether was introduced under pressure to the autoclave through the conduit over 14.5 hours with stirring. After cooling the autoclave, 28 g (0.18 mol) of methyl iodide was added, heated at 60° C. for 2.5 hours, further at 90° C. for 5 hours, and salt was removed in the same manner as in Production Example 3 to obtain 93 g of the desired polyoxyalkylene glycol derivative (having methoxy groups at both terminals), a glycidyl methyl ether polymer.

PRODUCTION EXAMPLE 7

Figure 3:
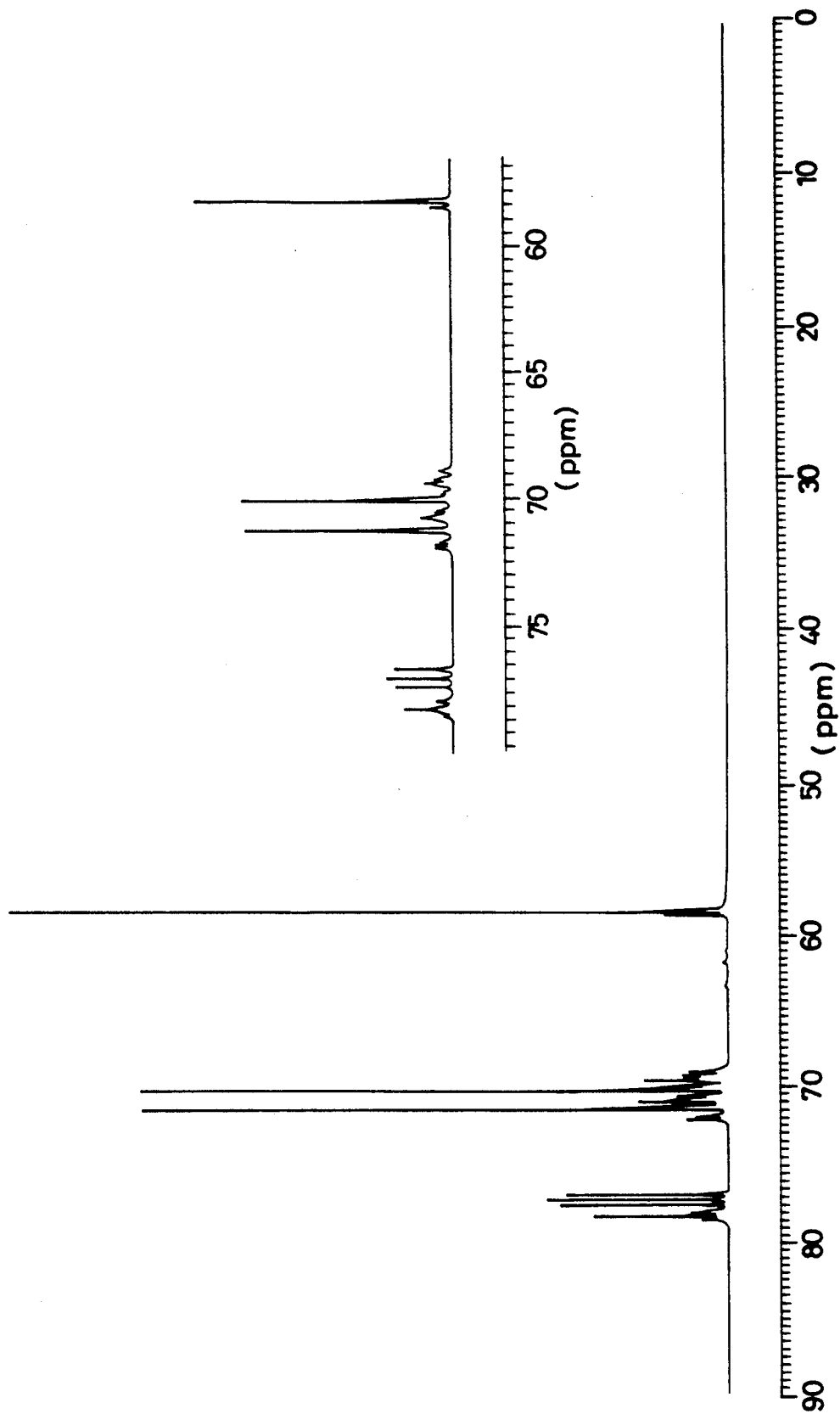
FIG. 3 shows $^{13}$C-NMR spectrum of polyoxyalkylene glycol obtained in Production Example 7.

The procedure of Production Example 1 was repeated except that 1.94 g (0.028 mol) of potassium methoxide was used, and 50 g of 4,7-dioxa-1,2-epoxyoctane (prepared by addition reaction of epichlorohydrin with 2-methoxyethanol in the presence of sulfuric acid to obtain chlorohydrin, which is further treated with alkali) was introduced under pressure to the autoclave over 20 hours, to obtain 48 g of the desired polyoxyalkylene glycol derivative (having a methoxy group at one terminal and a hydroxyl group at the other terminal), a 4,7-dioxa-1,2-epoxyoctane polymer. $^{13}$C-NMR spectrum (solvent: deuterochloroform) of said polyoxyalkylene glycol is shown in FIG. 3.

PRODUCTION EXAMPLE 8

The procedure of Production Example 1 was repeated except that 1.94 g (0.028 mol) of potassium methoxide was used, and 50 g of 4,7-dioxa-1,2-epoxy-5-methyloctane (prepared by additionreaction of epichlorohydrin with 1-methyoxy-2-propanol in the presence of sulfuric acid to obtain chlorohydrin, which is further treated with alkali) was introduced under pressure to the autoclave over 19 hours, to obtain 44 g of the desired polyoxyalkylene glycol derivative (having a methoxy group at one terminal and a hydroxyl group at the other terminal), a 4,7-dioxa-1,2-epoxy-5-methyloctane polymer.

PRODUCTION EXAMPLE 9

The procedure of Production Example 1 was repeated except that 1.24 g (0.018 mol) of potassium methoxide was used, and 50 g of 4,7-dioxa-1,2-epoxy-5-methyloctane was introduced under pressure to the autoclave over 20 hours, to obtain 45 g of the desired polyoxyalkylene glycol derivative (having a methoxy group at one terminal and a hydroxyl group at the other terminal), a 4,7-dioxa-1,2-epoxy-5-methyloctane polymer.

PRODUCTION EXAMPLE 10

Figure 4:
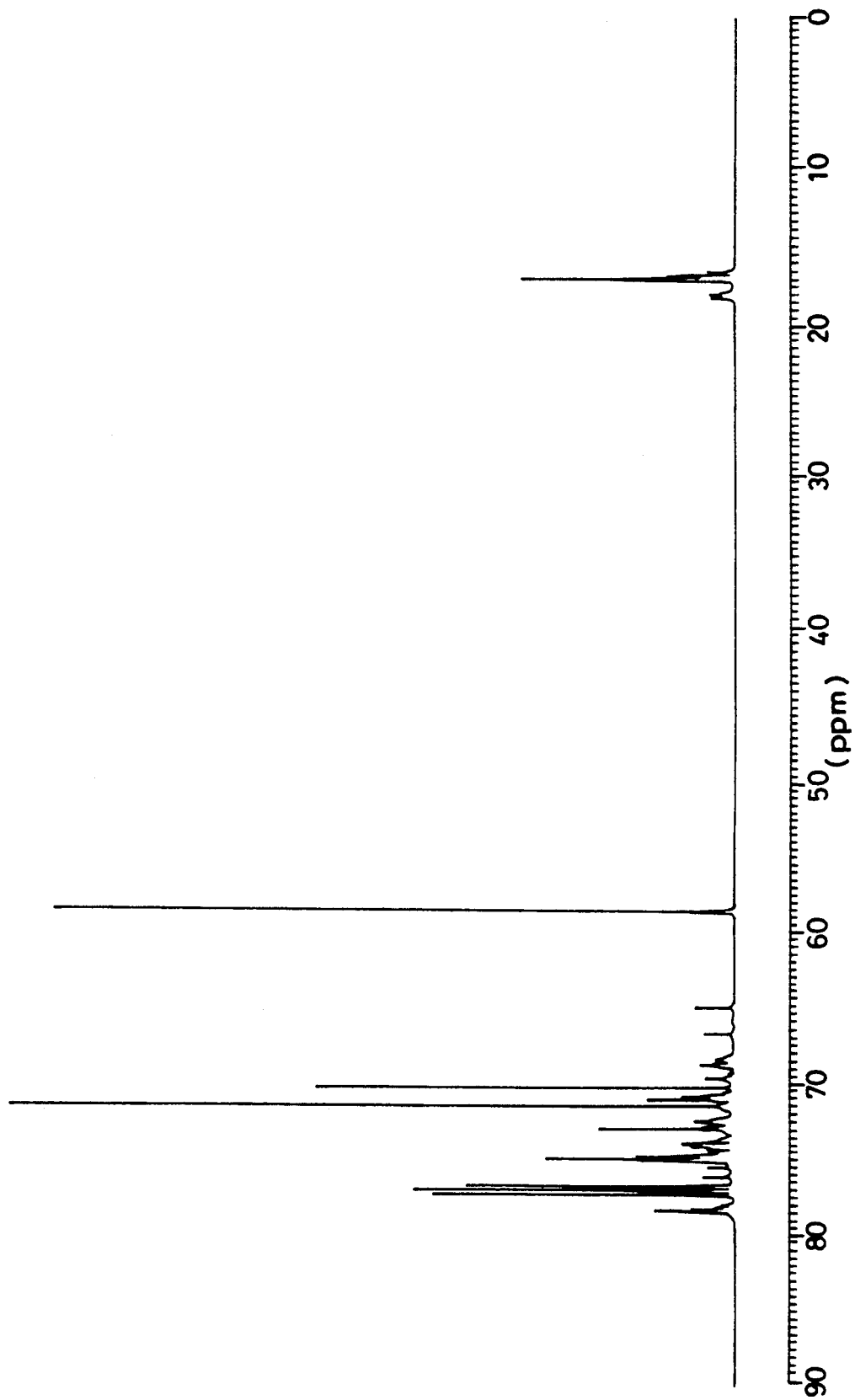
FIG. 4 shows $^{13}$C-NMR spectrum of polyoxyalkylene glycol obtained in Production Example 10.
Figure 11:
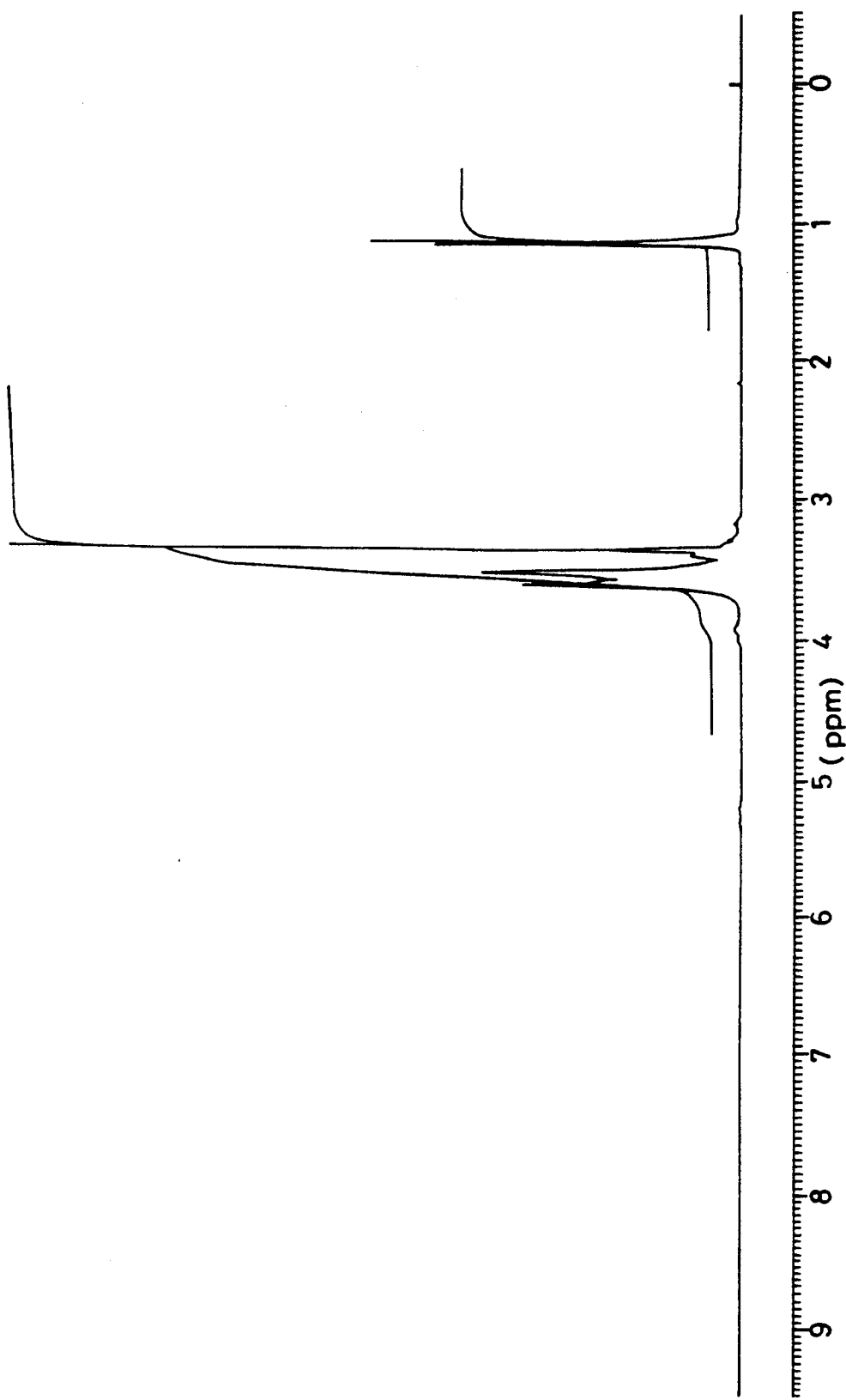
FIG. 11 shows $^1$H-NMR spectrum of polyoxyalkylene glycol obtained in Production Example 10.

The procedure of Production Example 1 was repeated except that 1.5 g (0.028 mol) of sodium methoxide was used, and 50 g of a mixture (molar ratio of 1:2.7) of 4,7-dioxa-1,2-epoxyoctane and propylene oxide was introduced under pressure to the autoclave over 10 hours, to obtain 45 g of the desired polyoxyalkylene glycol derivative (having a methoxyl group at one terminal and a hydroxyl group at the other terminal), a 4,7-dioxa-1,2-epoxyoctane-propylene oxide copolymer. $^{13}$C-NMR spectrum (solvent: deuterochloroform) of said polyoxyalkylene glycol is shown in FIG. 4 and $^1$H-NMR spectrum (solvent: deuterochloroform) is shown in FIG. 11.

PRODUCTION EXAMPLE 11

Figure 5:
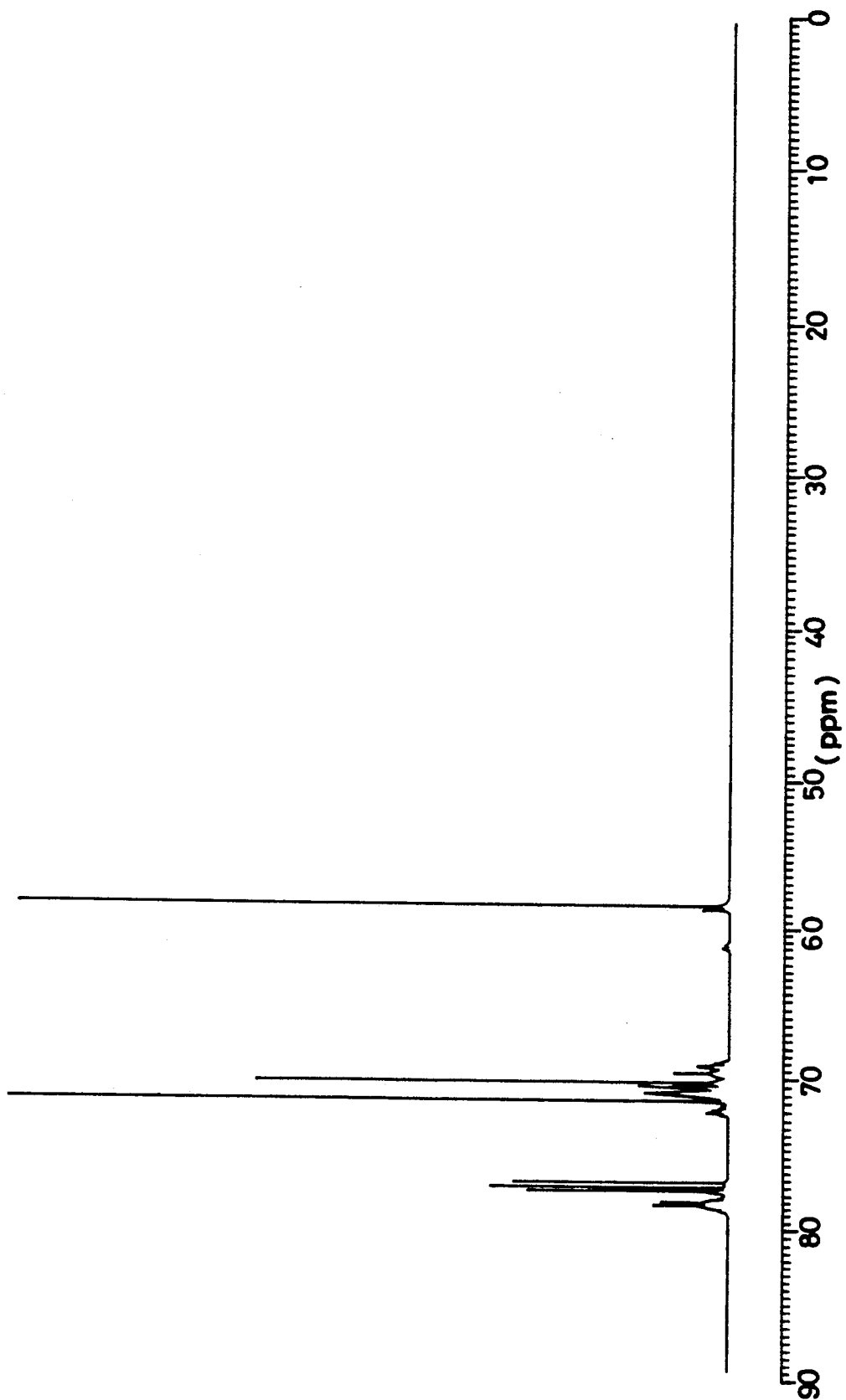
FIG. 5 shows $^{13}$C-NMR spectrum of polyoxyalkylene glycol obtained in Production Example 11.
Figure 12:
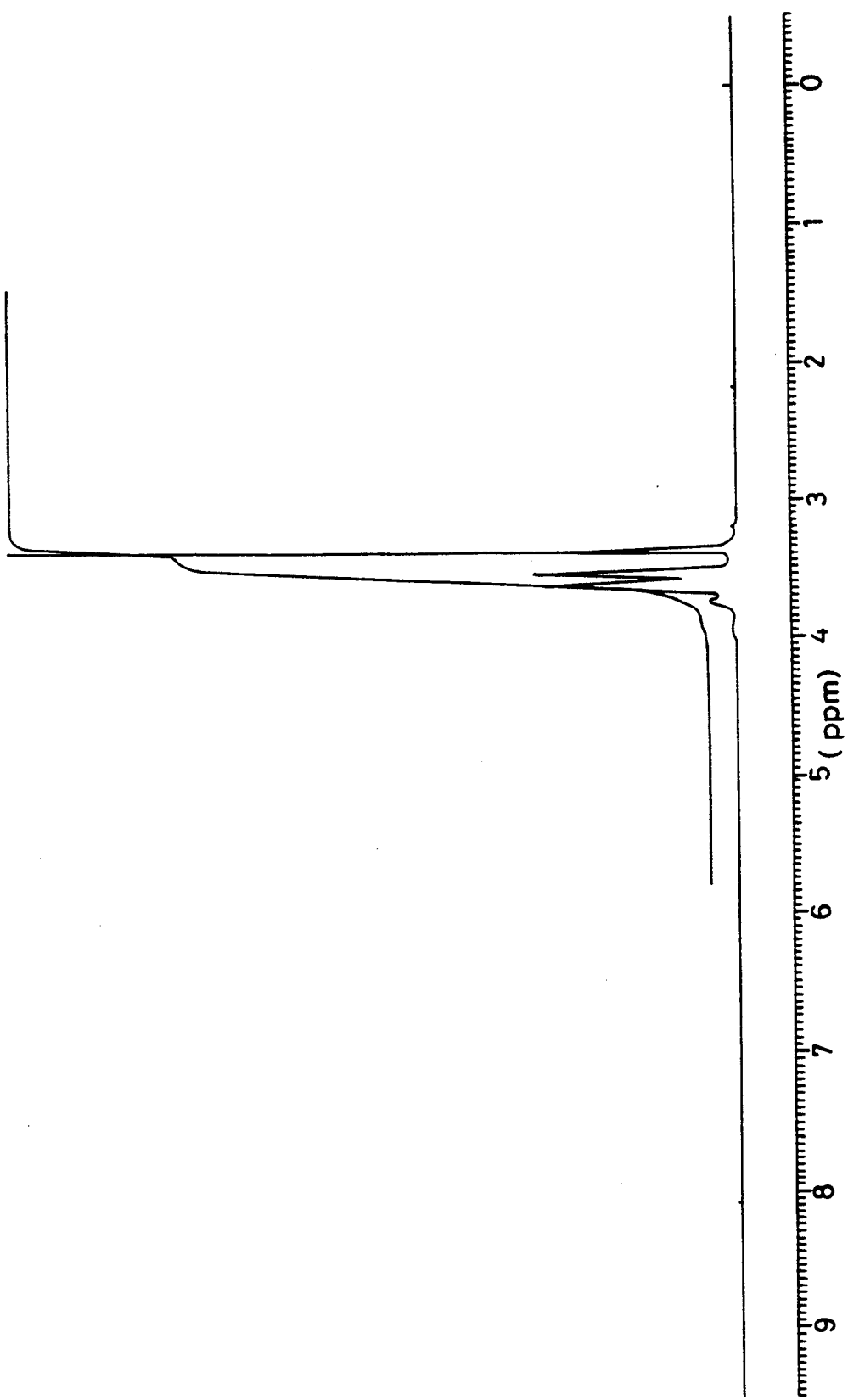
FIG. 12 shows $^1$H-NMR spectrum of polyoxyalkylene glycol obtained in Production Example 11.

The procedure of Production Example 1 was repeated except that 1.5 g (0.028 mol) of sodium methoxide was used, and 50 g of a mixture (molar ratio of 3:1) of 4,7-dioxa-1,2-epoxyoctane and ethylene oxide was introduced under pressure to the autoclave over 9 hours, to obtain 44 g of the desired polyoxyalkylene glycol derivative (having a methoxy group at one terminal and a hydroxyl group at the other terminal), a 4,7-dioxa-1,2-epoxyoctane-ethylene oxide copolymer. $^{13}$C-NMR spectrum (solvent: deuterochloroform) of said polyoxyalkylene glycol is shown in FIG. 5 and $^1$H-NMR spectrum (solvent: deuterochloroform) is shown in FIG. 12.

PRODUCTION EXAMPLE 12

The procedure of Production Example 2 was repeated except that 4.5 g (0.083 mol) of sodium methoxide wa used, and 100 g of glycidyl methyl ether introduced under pressure to the autoclave over 10 hours, to obtain 97 g of the desired polyoxyalkylene glycol derivative (having a methoxy group at one terminal and a hydroxyl group at the other terminal), a glycidyl methyl ether copolymer.

PRODUCTION EXAMPLE 13

Figure 7:
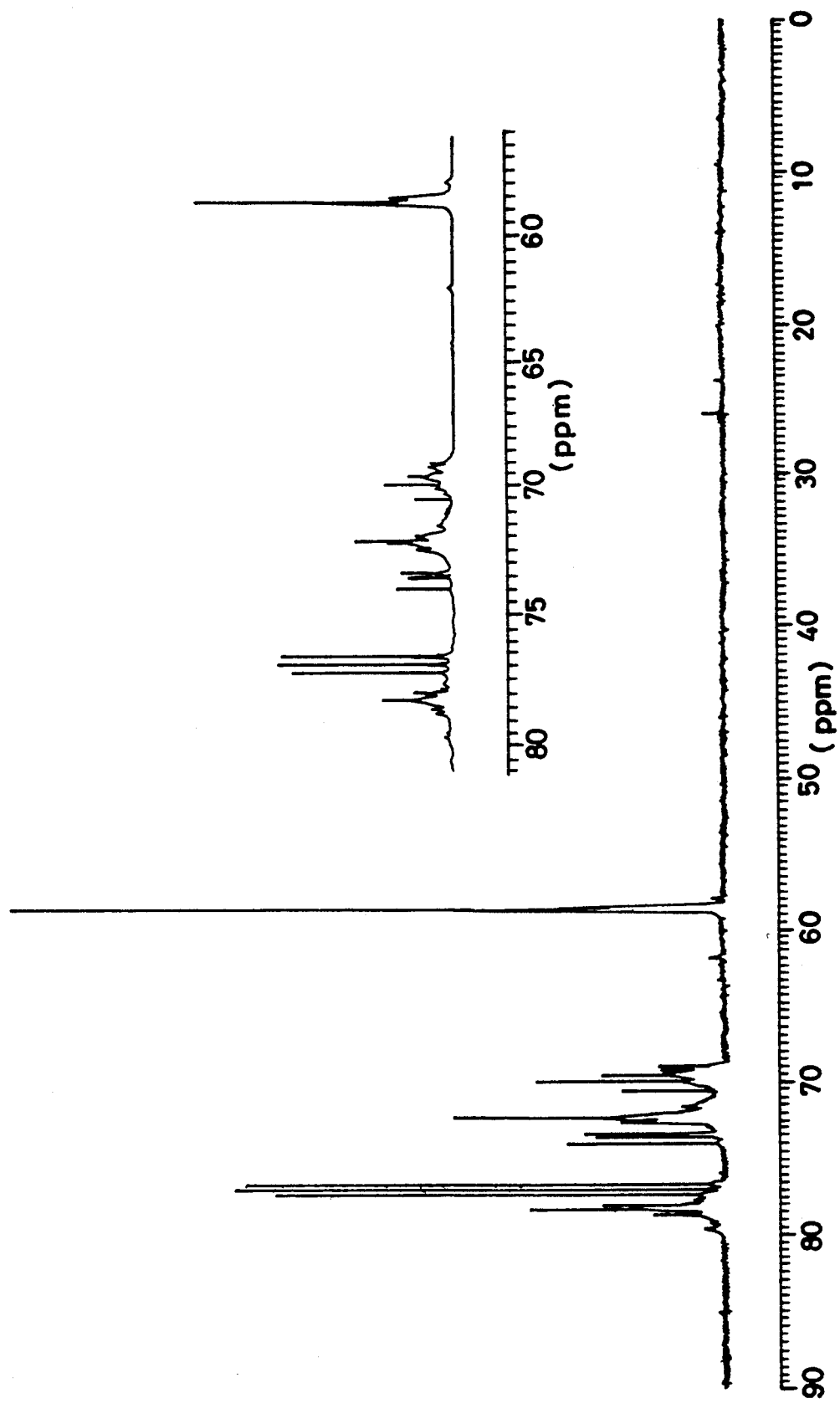
FIG. 7 shows $^{13}$C-NMR spectrum of polyoxyalkylene glycol obtained in Production Example 13.

The procedure of Production Example 1 was repeated except that 1.94 g (0.028 mol) of potassium methoxide and 50 g of 2,7-dioxa-4,5-epoxyoctane (prepared by reaction of 1,4-dichloro-2-butene with sodium methoxide to obtain 1,4-dimethoxy-2-butene, which is bromohydrinated with N-bromosuccinimide and treated with sodium hydroxide) was introduced under pressure to the autoclave over 19 hours, to obtain 38 g of the desired polyoxyalkylene glycol (having a methoxyl group at one terminal and a hydroxyl group at the other terminal), a 2,7-dioxa-4,5-epoxyoctane polymer. $^{13}$C-NMR spectrum (solvent: deuterochloroform) of said polyoxyalkylene glycol is shown in FIG. 7.

PRODUCTION EXAMPLE 14

Figure 8:
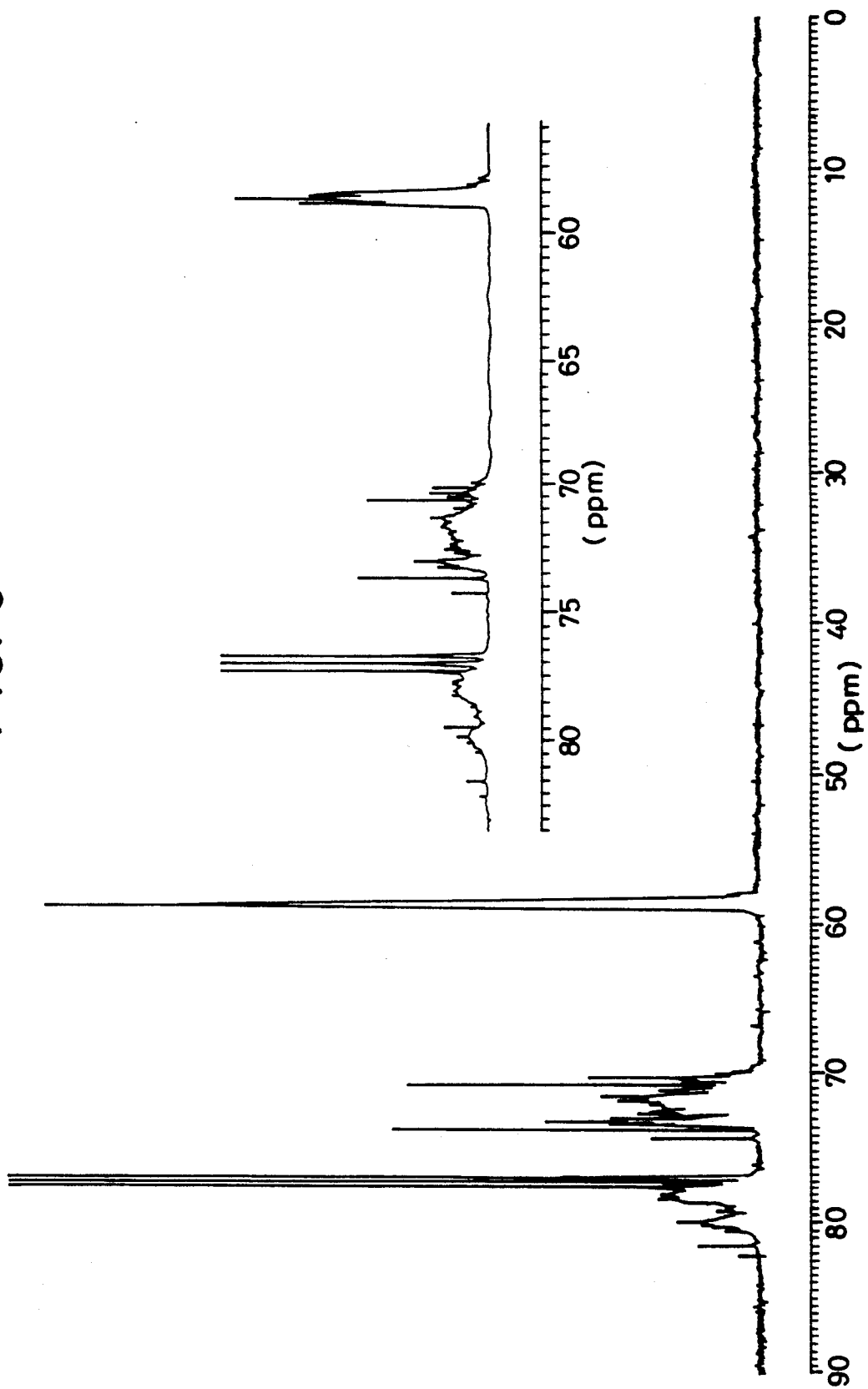
FIG. 8 shows $^{13}$C-NMR spectrum of polyoxyalkylene glycol obtained in Production Example 14.

The procedure of Production Example 1 was repeated except that 1.29 g (0.019 mol) of potassium methoxide was used, and 50 g of a mixture (molar ratio of 2:1) of 2,7-dioxa-4,5-epoxyoctane and glycidyl methyl ether was introduced under pressure to the autoclave over 23 hours, to obtain 22 g of the desired polyoxyalkylene glycol (having a methoxy group at one terminal and a hydroxyl group at the other terminal), a 2,7-dioxa-4,5-epoxyoctane-glycidyl methyl ether copolymer. $^{13}$C-NMR spectrum (solvent: deuterochloroform) of said polyoxyalkylene glycol is shown in FIG. 8.

PRODUCTION EXAMPLE 15

The procedure of Production Example 1 was repeated except that 1.0 g (0.014 mol) of potassium methoxide and 50 g of 4,8-dioxa-1,2-epoxy-6-methoxynonane (prepared by hydration of allyl glycidyl ether to form diol, which is reacted with sodium methoxide to obtain disodium salt, which is methoxylated with methyl iodide to form 4, 8-dioxa-6-methoxy-1-nonene, which is bromohydrinated with N-bromosuccinimide and treated with sodium hydroxide) was introduced under pressure to the autoclave over 13 hours, to obtain 43 g of the desired polyoxyalkylene glycol (having a methoxy group at one terminal and a hydroxyl group at the other terminal), a 4,8-dioxa-1,2-epoxy-6-methoxy-nonane polymer.

PRODUCTION EXAMPLE 16

The procedure of Production Example 1 was repeated except that 1.0 g (0.014 mol) of potassium methoxide and 38 g of 4,8-dioxa-1,2-epoxy-6-methoxynonane was introduced under pressure to the autoclave over 10 hours, to obtain 34 g of the desired polyoxyalkylene glycol (having a methoxy group at one terminal and a hydroxyl group at the other terminal), a 4,8-dioxa-1,2-epoxy-6-methoxy-nonane polymer.

PRODUCTION EXAMPLE 17

The procedure of Production Example 1 was repeated except that 1.2 g (0.017 mol) of potassium methoxide and 39 g of 4,7-dioxa-1,2-epoxy-5-(2-oxapropyl)octane (prepared by reaction of glycidyl methyl ether and methanol in the presence of sulfuric acid to obtain 2,6-dioxa-4-hydroxymethyl, which is reacted with epichlorohydrin in the presence of sulfuric acid and then treated with sodium hydroxide) was introduced under pressure to the autoclave over 19 hours to obtain 29 g of the desired polyoxyalkylene glycol (having a methoxy group at one terminal and a hydroxyl group at the other terminal), a 4,7-dioxa-1,2-epoxy-5-(2-oxapropyl)octane polymer.

EXAMPLES 1 TO 17 AND COMPARATIVE EXAMPLES 1 TO 6

The miscibility of the compounds obtained in Production Examples 1 to 17, polypropylene glycol having a butyl ether group (butoxy group) at one terminal and a hydroxyl group at the other terminal, and polypropylene glycol having hydroxyl groups at both terminals was measured.

A prescribed amount of a sample was placed in a pressure glass ampule so that the amount of the sample would be 10% by weight and 20% by weight to R-134a, and this ampule was jointed to a vacuum line and R-134a-gas line. The ampule was subjected to vacuum degassing at room temperature and cooled with liquid nitrogen to take out the prescribed amount of R-134a.

Subsequently, the ampule was sealed, heated from −40° C. in a thermostat and the initial temperature of phase separation was measured. The higher phase separation temperature is preferable. The results are shown in Table 1. The measurement of the average molecular weight was carried out on GPC (gel permeation chromatography) (standard reference material: polyethylene glycol).

TABLE 1

| No. | Sample | From | Kinematic Viscosity (cSt) 40° C. | Kinematic Viscosity (cSt) 100° C. | Viscosity Index | Initial Temperature of Phase Separation (°C.) 10%* | Initial Temperature of Phase Separation (°C.) 20%* | Average Molecular Weight |
|---|---|---|---|---|---|---|---|---|
| Example 1 | Glycidyl methyl ether-propyleneoxide copolymer | Product of Production Example 1 | 96.9 | 14.9 | 161 | 65.0 | 66.5 | 1470 |
| Example 2 | Glycidyl methyl ether polymer | Product of Production Example 2 | 125.2 | 14.7 | 119 | 79.5 | 81.0 | 994 |
| Example 3 | Glycidyl methyl ether-propylene oxide copolymer | Product of Production Example 3 | 68.9 | 12.7 | 186 | 70.5 | 73.5 | 1408 |
| Example 4 | Glycidyl methyl ether-propylene oxide copolymer | Product of Production Example 4 | 78.1 | 12.4 | 161 | 71.5 | 73.0 | 1132 |
| Example 5 | Glycidyl methyl ether polymer | Product of Production Example 5 | 188.7 | 21.1 | 133 | 70.0 | 72.5 | 1374 |
| Example 6 | Glycidyl methyl ether polymer | Product of Production Example 6 | 125.6 | 15.0 | 123 | 70.0 | 70.0 | 1023 |
| Example 7 | 4,7-dioxa-1,2-epoxyoctane polymer | Product of Production Example 7 | 87.6 | 14.7 | 175 | 74.0 | 74.5 | 1392 |
| Example 8 | 4,7-dioxa-1,2-epoxy-5-methyloctane polymer | Product of Production Example 8 | 94.9 | 14.1 | 153 | 78.0 | 81.0 | 1408 |
| Example 9 | 4,7-dioxa-1,2-epoxy-5-methyloctane polymer | Product of Production Example 9 | 127.1 | 18.4 | 163 | 72.5 | 76.0 | 1700 |
| Example 10 | 4,7-dioxa-1,2-epoxyoctane-propylene oxide copolymer | Product of Production Example 10 | 128.2 | 20.8 | 187 | 57.0 | 58.5 | 2138 |
| Example 11 | 4,7-dioxa-1,2-epoxyoctane-ethylene oxide copolymer | Product of Production Example 11 | 208.8 | 32.7 | 203 | 53.0 | 54.5 | 2492 |
| Example 12 | Glycidyl methyl ether polymer | Product of Production Example 12 | 79.5 | 10.29 | 111 | 87.0 | 90.0 | 770 |
| Example 13 | 2,7-dioxa-4,5-epoxyoctane polymer | Product of Production Example 13 | 183.0 | 10.19 | 45 | 90.0 | 90.0 | 464 |
| Example 14 | 2,7-dioxa-4,5-epoxyoctane-glycidylmethy ether copolymer | Product of Production Example 14 | 110.2 | 11.12 | 83 | 90.0 | 90.0 | 744 |
| Example 15 | 4,8-dioxa-1,2-epoxy-6-methoxynonane polymer | Product of Production Example 15 | 255.9 | 31.3 | 164 | 66.5 | 68.0 | 2760 |
| Example 16 | 4,8-dioxa-1,2-epoxy-6-methoxynonane polymer | Product of Production Example 16 | 180.0 | 23.1 | 156 | 72.0 | 74.0 | 2020 |
| Example 17 | 4,7-dioxa-1,2-epoxy-5-(2-oxapropyl)octane polymer | Product of Production Example 17 | 29.4 | 4.6 | 49 | 90.0 | 90.0 | 553 |
| Comparative Example 1 | Polyoxypropylene glycol mono-n-butyl ether | Unilube MB-11 produced by Nippon Oil & Fats Co., Ltd. | 56.1 | 10.8 | 187 | 51.5 | 58.0 | — |
| Comparative Example 2 | Polyoxypropylene glycol mono-n-butyl ether | Unilube MB-14 produced by Nippon | 73.4 | 13.8 | 195 | 38.5 | 40.0 | — |

TABLE 1-continued

| No. | Sample | From | Kinematic Viscosity (cSt) 40° C. | Kinematic Viscosity (cSt) 100° C. | Viscosity Index | Initial Temperature of Phase Separation (°C.) 10%* | Initial Temperature of Phase Separation (°C.) 20%* | Average Molecular Weight |
|---|---|---|---|---|---|---|---|---|
| Comparative Example 3 | Polyoxypropylene glycol mono-n-butyl ether | Unilube MB-19 produced by Nippon Oil & Fats Co., Ltd. | 105.0 | 18.9 | 202 | 8.0 | 31.0 | — |
| Comparative Example 4 | Polyoxypropylene glycol (dihydroxyl group) | Sannix PP 950 produced by Sanyo Chemical Industries, Ltd. | 63.2 | 9.8 | 139 | 70.5 | 68.5 | — |
| Comparative Example 5 | Polyoxypropylene glycol (dihydroxyl group) | Sannix PP 2000 produced by Sanyo Chemical Industries, Ltd. | 150.3 | 23.4 | 187 | 7.0 | 6.0 | — |
| Comparative Example 6 | Polyoxypropylene glycol (trihydroxyl group) | Sannix GP 1000 produced by Sanyo Chemical Industries, Ltd. | 103.2 | 12.2 | 110 | 67.0 | 55.0 | — |

*Ratio (% by weight) of polyoxyalkyleneglycol to 1,1,1,2-tetrafluoroethane.

REFERENCE EXAMPLE

In a 200-milliliter stainless steel autoclave equipped with a stirrer and a conduit, 3.0 g (0.056 mol) of powdery sodium methoxide was placed, sealed and heated to 110° C. 120 g of propylene oxide was introduced under pressure to the autoclave through the conduit over 13 hours with stirring.

To the reaction mixture, 120 ml of water and 240 ml of methanol were added and dissolved, and then the solution was passed through a 200 ml-column of cation-exchange resin and then through a 200 ml-column of anion-exchange resin to remove a sodium ion. After methanol and water were distilled away, the residue was dried at 100° C. for one hour under reduced pressure (0.4 mmHg) with a vacuum pump to obtain 115 g of the desired polyoxyalkylene glycol (having a methoxy group at one terminal and a hydroxyl group at the other terminal), a propylene oxide polymer. $^{13}$C-NMR spectrum (solvent: deuterochloroform) of said polyoxyalkylene glycol is shown in FIG. 6.

The following is shown according to FIGS. 1 to 8.

Figure 6:
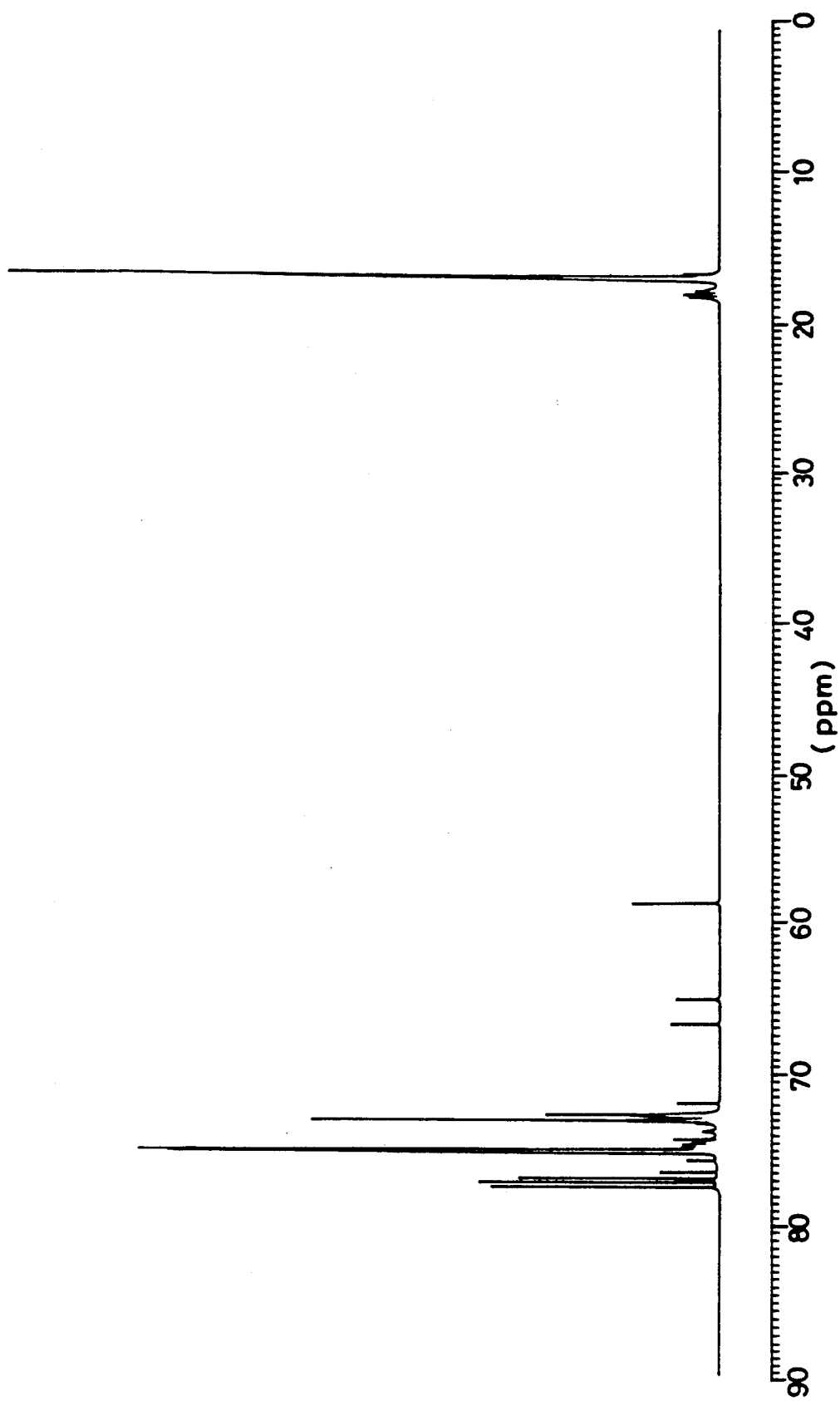
FIG. 6 shows $^{13}$C-NMR spectrum of polyoxyalkylene glycol obtained in Reference Example.

FIG. 1 is different from either FIG. 2 or 6. This indicates that polyoxyalkylene glycol obtained in Production Example 1 is not a mere blend of a glycidyl methyl ether polymer of Production Example 5 and a propylene oxide polymer of Reference Example. And also, in FIG. 1, the peak assignable to —CH$_2$— in

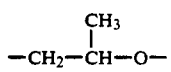

was observed near 73 ppm, the peak assignable to —CH$_2$— in the main chain of

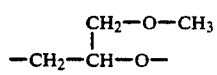

was observed near 74 ppm, and further the peak assignable to —CH$_2$— in the side chain thereof was observed to be dispersed near 68.5 to 70 ppm.

On the other hand, in FIG. 2, the peak assignable to —CH$_2$— in the main chain of the polymer in the Production Example 5 was observed near 69.5 ppm.

Consequently, the polymer of Production Example 1 was found to be a copolymer wherein a unit:

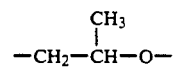

and a unit: 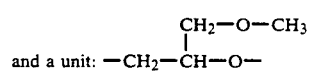

are present. And also, the peak of a methoxy group was observed near 59 ppm. Consequently, the product of Production Example 1 was confirmed to be a glycidyl methyl etherpropylene oxide copolymer.

FIG. 4 is different from either FIG. 3 or 6. This indicates that polyoxyalkylene glycol obtained in Production Example 10 is not a mere blend of a 4,7-dioxa-1,2-epoxyoctane polymer of Production Example 7 and a propylene oxide polymer of Reference Example. In FIG. 4, the peak assignable to —CH$_2$— in

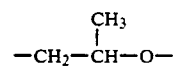

was observed near 72 to 77 ppm, and also the peak assignable to —CH$_2$— in

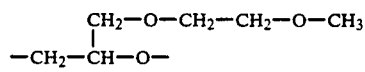

was observed to be dispersed at 68 to 72.5 ppm.

On the other hand, in FIG. 3, the peak assignable to —CH$_2$— in 4,7-dioxa-1,2-epoxy-5-methyloctane homopolymer was observed to be dispersed at 68.8 to 72.0 ppm, but the pattern of FIG. 4 near 68 to 70 ppm was different from that of FIGS. 3 and 6, and therefore it has been found that polyoxyalkylene glycol obtained in Production Example 10 is not a mere blend.

And also, the peak assignable to a methine group of a main chain attributed to a 4,7-dioxa-1,2-epoxy unit in a copolymer was observed near 79 ppm, and further the peak of a methoxy group was observed near 59 ppm.

Consequently, it was confirmed that 4,7-dioxa-1,2-epoxypropylene oxide copolymer existed in the product of Production Example 10.

In FIG. 5, the peak assignable to —CH$_2$— in

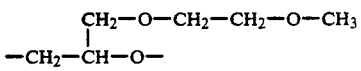

and —CH$_2$—CH$_2$—O— was observed at 69 to 72.5 ppm, and the peak assignable to —CH— in

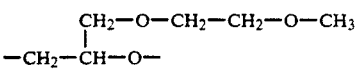

was observed near 78.5 ppm. On the other hand, in FIG. 3, the peak asignable to

in 4,7-dioxa-1,2-epoxy-5-metyloctane homopolymer was observed near 78.5 ppm, but the pattern of FIG. 3 is different from that of FIG. 5. The peak assignable to —CH$_2$— in —CH$_2$—CH$_2$—O— was observed near 70.6 ppm.

Consequently, it was confirmed that the product of Production Example 11 was not a mere blend of homopolymers and in said product, but 4,7-dioxa-1,2-epoxyethyleneoxide copolymer existed.

FIG. 8 is different from either FIG. 2 or 7. This indicated that polyoxyalkylene glycol obtained in Production Example 14 is not a mere blend of glycidyl methyl ether polymer of Production Example 5 and a 2,7-dioxa-4,5-epoxyoctane polymer of Production Example 13. And also, in FIG. 8, the peak assignable to —CH$_2$— of a main chain in

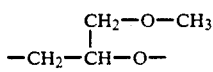

and

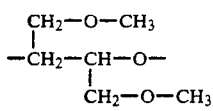

was observed at 68.5 to 71 ppm, and the peak assignable to —CH$_2$— of a side chain therein at 71 to 74 ppm. On the other hand, in FIG. 7, the peak assignable to —CH$_2$— in 2,7-dioxa-4,5-epoxyoctane homopolymer was observed at 70 to 74.5 ppm, and no peak was observed at 68.5 to 70 ppm. In FIG. 2, the peak assignable to —CH$_2$— of a side chain in glycidyl methyl ether homopolymer was observed near 69.5 ppm, but it does not coincide in position with the peak in FIG. 8.

Consequently, it was confirmed that 2,7-dioxa-4,5-epoxyoctane-glycidyl methyl ether copolymer existed in the product of Production Example 14.

AS TO THE POLYMER OF PRODUCTION EXAMPLE 1

The ratio of the composition calculated from the values, after correction for —OC$\underline{H}_3$ at the terminals, obtained by integrating protons of

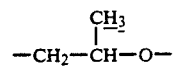

and combined protons of

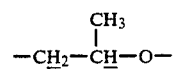

and

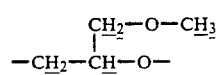

in FIG. 9 was

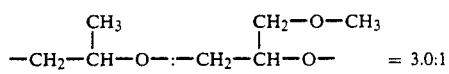

= 3.0:1

AS TO THE POLYMER OF PRODUCTION EXAMPLE 4

The ratio of the composition calculated in FIG. 10 in the same manner as in the polymer of Production Example 1 was

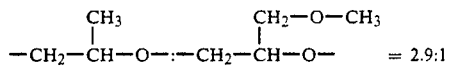

= 2.9:1

AS TO THE POLYMER OF PRODUCTION EXAMPLE 10

The ratio of the composition calculated from the values, after correction for —OC$\underline{H}_3$— at the terminal, obtained by integrating protons of

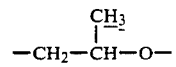

and combined protons of

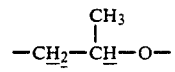

and

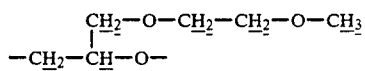

in FIG. 11 was

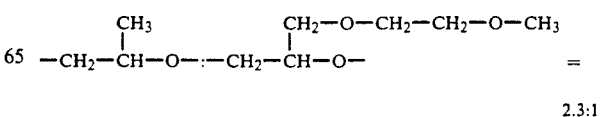

= 2.3:1

AS TO THE POLYMER OF PRODUCTION EXAMPLE 11

The ratio of the composition calculated from the value, after correction for —OCH$_3$— at the terminal, obtained by integrating protons of

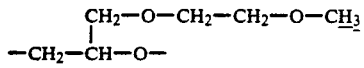

and the integration value of combined protons of

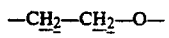

and

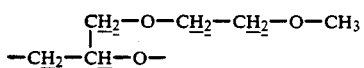

in FIG. 12 was

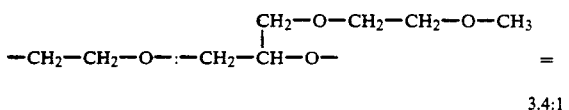

$= 3.4:1$

What is claimed is:

1. A lubricating oil composition for compression-type refrigerators comprising 1,1,1,2-tetrafluoroethane as a refrigerant and a polyoxyalkylene glycol derivative which has at least one constitutional unit represented by the general formula:

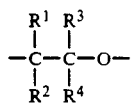

wherein R$^1$ to R$^4$ are each a hydrogen, a methyl group or a group represented by the general formula:

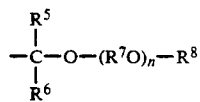

with one or two of R$^1$ to R$^4$ being groups represented by the general formula (II) wherein R$^5$ and R$^6$ are each hydrogen, a monovalent hydrocarbon group having 1 to 10 carbon atoms or an alkoxyalkyl group having 2 to 20 carbon atoms, R$^7$ is an alkylene group having 2 to 5 carbon atoms, a substituted alkylene group having 3 to 5 total carbon atoms with an alkyl group as a substituent, or a substituted alkylene group having 4 to 10 total carbon atoms with an alkoxyalkyl group as a substituent, n is an integer of 0 to 20 and R$^8$ is a monovalent hydrocarbon group having 1 to 10 carbon atoms and said polyoxyalkylene glycol derivative has a hydroxyl group, an acyloxyl group having 1 to 10 carbon atoms, an alkoxyl group having 1 to 10 carbon atoms or an aryloxyl group having 6 to 10 carbon atoms, at each terminal and has a kinematic viscosity of 1 to 100 cSt at 100° C.

2. A lubricating oil composition for compression-type refrigerators comprising a tetrafluoroethane and a polyoxyalkylene glycol derivative which has at least one constitutional unit represented by the general formula:

wherein R$^1$ to R$^4$ are each a hydrogen, a methyl group or a group represented by the general formula:

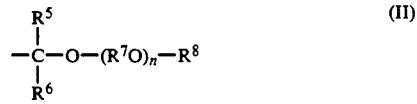

with one or two of R$^1$ to R$^4$ being groups represented by the general formula (II) wherein R$^5$ and R$^6$ are each hydrogen, a monovalent hydrocarbon group having 1 to 10 carbon atoms or an alkoxyalkyl group having 2 to 20 carbon atoms, R$^7$ is an alkylene group having 2 to 5 carbon atoms, a substituted alkylene group having 3 to 5 total carbon atoms with an alkyl group as a substituent, or a substituted alkylene group having 4 to 10 total carbon atoms with an alkoxyalkyl group as a substituent, n is an integer of 0 to 20 and R$^8$ is a monovalent hydrocarbon group having 1 to 10 carbon atoms and said polyoxyalkylene glycol derivative has a hydroxyl group, an acyloxyl group having 1 to 10 carbon atoms, an alkoxyl group having 1 to 10 carbon atoms or an aryloxyl group having 6 to 10 carbon atoms, at each terminal and has a kinematic viscosity of 1 to 100 cSt at 100° C.

3. A lubricating oil composition for compression-type refrigerators according to claim 2 wherein the amount of the polyoxyalkylene glycol derivative is sufficient to provide lubricity.

4. A lubricating oil composition for compression-type refrigerators according to claim 2, wherein R$^5$ and R$^6$ are each a hydrogen, R$^7$ is an ethylene group, a 1-methylethylene group, a 2-methylethylene group or a trimethylene group; R$^8$ is a hydrocarbon group having 1 to 3 carbon atoms, and n is an integer of 0 to 3 in the general formula (II).

5. A lubricating oil composition for compression-type refrigerators according to claim 2, wherein said polyoxyalkylene glycol derivative is a homopolymer having said constitutional unit represented by the general formula (I).

6. A lubricating oil composition for compression-type refrigerators according to claim 2, wherein said polyoxyalkylene glycol derivative is a copolymer having 1 to 200 constitutional units made up of at least two of said constitutional units represented by the general formula (I).

7. The lubricating oil composition for compression-type refrigerators according to claim 6, wherein R$^5$ and R$^6$ are each a hydrogen, R$^7$ is an ethylene group, a 1-methylethylene group, a 2-methylethylene group or a trimethylene group; R$^8$ is a hydrocarbon group having 1 to 3 carbon atoms, and n is an integer of 0 to 3 in the general formula (II).

8. A lubricating oil composition for compression-type refrigerators according to claim 2, wherein said polyoxyalkylene glycol derivative is a copolymer having 1 to 200 constitutional units made up of said at least one constitutional unit represented by the general formula (I) and having 1 to 200 constitutional units of at least one constitutional unit represented by the general formula:

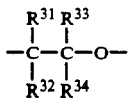 (III)

wherein $R^{31}$ to $R^{34}$ are each hydrogen or an alkyl group having 1 to 3 carbon atoms.

9. A lubricating oil composition for compression-type refrigerators according to claim 8, wherein $R^5$ and $R^6$ are each a hydrogen, $R^7$ is an ethylene group, a 1-methylene group, a 2-methylene group or a trimethylene group; $R^8$ is a hydrocarbon group having 1 to 3 carbon atoms, and n is an integer of 0 to 3.

10. A method for improving lubricity in compression-type refrigerators which comprises employing a tetrafluoroethane as a refrigerant and a lubricating oil comprising, as an essential component, a polyoxyalkylene glycol derivative which has at least one constitutional unit represented by the general formula:

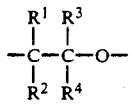 (I)

wherein $R^1$ to $R^4$ are each hydrogen, a methyl group or a group represented by the general formula:

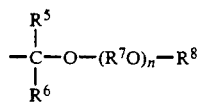 (II)

with one or two of $R^1$ to $R^4$ being groups represented by the general formula (II) wherein $R^5$ and $R^6$ are each hydrogen, a monovalent hydrocarbon group having 1 to 10 carbon atoms or an alkoxyalkyl group having 2 to 20 carbon atoms, $R^7$ is an alkylene group having 2 to 5 carbon atoms, a substituted alkylene group having 3 to 5 total carbon atoms with an alkyl group as a substituent, or a substituted alkylene group having 4 to 10 total carbon atoms with an alkoxyalkyl group as a substituent, n is an integer of 0 to 20 and $R^8$ is a monovalent hydrocarbon group having 1 to 10 carbon atoms and said polyoxyalkylene glycol derivative has a hydroxyl group, an acyloxyl group having 1 to 10 carbon atoms, an alkoxyl group having 1 to 10 carbon atoms or an aryloxyl group having 6 to 10 carbon atoms, at each terminal and has a kinematic viscosity of 1 to 100 cSt at 100° C.

11. A compression-type refrigerator system which comprises a compressor, a refrigerant comprising a tetrafluoroethane, and a lubricant comprising, as an essential component, a polyoxylalkylene glycol derivative which has at least one constitutional unit represented by the general formula:

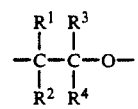 (I)

wherein $R^1$ to $R^4$ are each hydrogen, a methyl group or a group represented by the general formula:

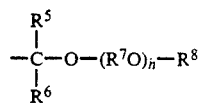 (II)

with one or two of $R^1$ to $R^4$ being groups represented by the general formula (II) wherein $R^5$ and $R^6$ are each hydrogen, a monovalent hydrocarbon group having 1 to 10 carbon atoms or an alkoxyalkyl group having 2 to 20 carbon atoms, $R^7$ is an alkylene group having 2 to 5 carbon atoms, a substituted alkylene group having 3 to 5 total carbon atoms with an alkyl group as a substituent, or a substituted alkylene group having 4 to 10 total carbon atoms with an alkoxyalkyl group as a substituent, n is an integer of 0 to 20 and $R^8$ is a monovalent hydrocarbon group having 1 to 10 carbon atoms and said polyoxyalkylene glycol derivative has a hydroxyl group, an acyloxyl group having 1 to 10 carbon atoms, an alkoxyl group having 1 to 10 carbon atoms or an aryloxyl group having 6 to 10 carbon atoms, at each terminal and has a kinematic viscosity of 1 to 100 cSt at 100° C.

* * * * *